(12) United States Patent
Hirao et al.

(10) Patent No.: US 8,064,147 B2
(45) Date of Patent: Nov. 22, 2011

(54) IMAGING LENS, IMAGING DEVICE, PORTABLE TERMINAL, AND METHOD FOR MANUFACTURING IMAGING LENS

(75) Inventors: Yusuke Hirao, Sakai (JP); Keiji Matsusaka, Osaka (JP); Yasunari Fukuta, Sakai (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 150 days.

(21) Appl. No.: 12/525,837

(22) PCT Filed: Feb. 19, 2008

(86) PCT No.: PCT/JP2008/052762
§ 371 (c)(1),
(2), (4) Date: Aug. 5, 2009

(87) PCT Pub. No.: WO2008/102774
PCT Pub. Date: Aug. 28, 2008

(65) Prior Publication Data
US 2010/0321794 A1    Dec. 23, 2010

(30) Foreign Application Priority Data

Feb. 19, 2007   (JP) .................................. 2007-038221

(51) Int. Cl.
*G02B 3/02*    (2006.01)
*G02B 9/00*    (2006.01)

(52) U.S. Cl. ....................................... 359/716; 359/754

(58) Field of Classification Search ................... 359/708, 359/713–716, 733–735, 754–792
See application file for complete search history.

(56) References Cited

U.S. PATENT DOCUMENTS

| 2005/0265150 A1 | 12/2005 | Hirayama et al. | 369/44.37 |
| 2006/0262416 A1 | 11/2006 | Lee et al. | 359/645 |
| 2009/0225441 A1* | 9/2009 | Do | 359/716 |
| 2010/0007970 A1* | 1/2010 | Shinohara | 359/774 |

FOREIGN PATENT DOCUMENTS

| EP | 2 023 177 A1 | 2/2009 |
| JP | 2006-12371 A | 1/2006 |
| JP | 2006-133270 A | 5/2006 |
| JP | 2006-323365 A | 11/2006 |
| JP | 3976782 B1 | 6/2007 |
| JP | 3946245 B1 | 7/2007 |
| JP | 4022246 B1 | 10/2007 |
| WO | WO 2008/102774 A1 | 8/2008 |

* cited by examiner

*Primary Examiner* — Darryl J Collins
(74) *Attorney, Agent, or Firm* — Sidley Austin LLP

(57) ABSTRACT

An imaging lens (LN) includes at least three lens blocks (BK), and an aperture stop (ape). The lens block (BK) includes parallel flat lens substrates (LS) formed of different materials, and a lens (L). In the imaging lens (LN), the object side lens surface of a first lens (L1) included in a first lens block (BK1) is a surface protruding to the object side, the object side lens surface of a third lens (L3) included in a second lens block (BK2) is a surface recessed from the object side, and at least the object side lens surface of a fifth lens (L5) or the object side lens surface of a sixth lens (L6) included in a third lens block (BK3) is aspherical.

14 Claims, 20 Drawing Sheets

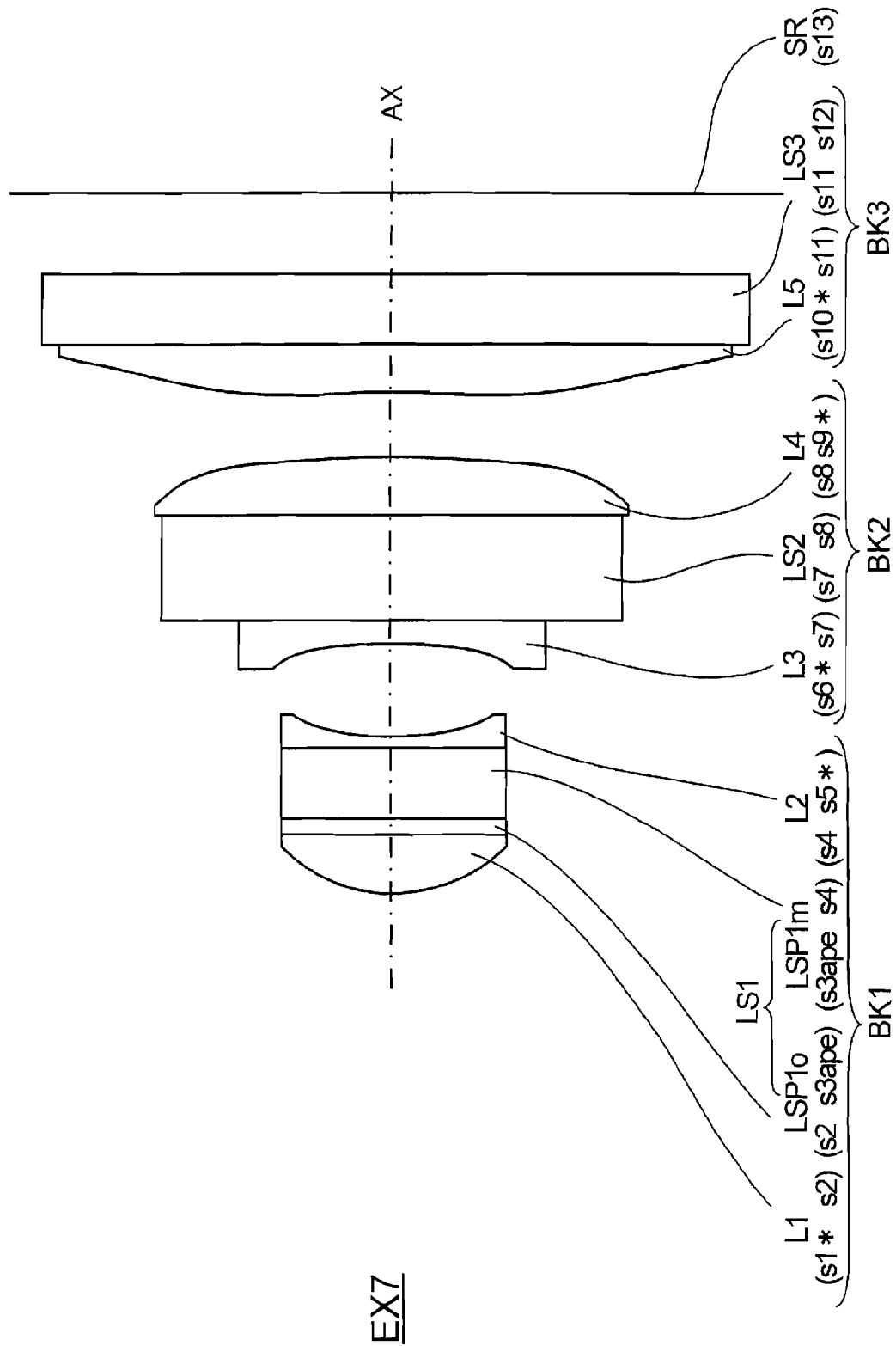

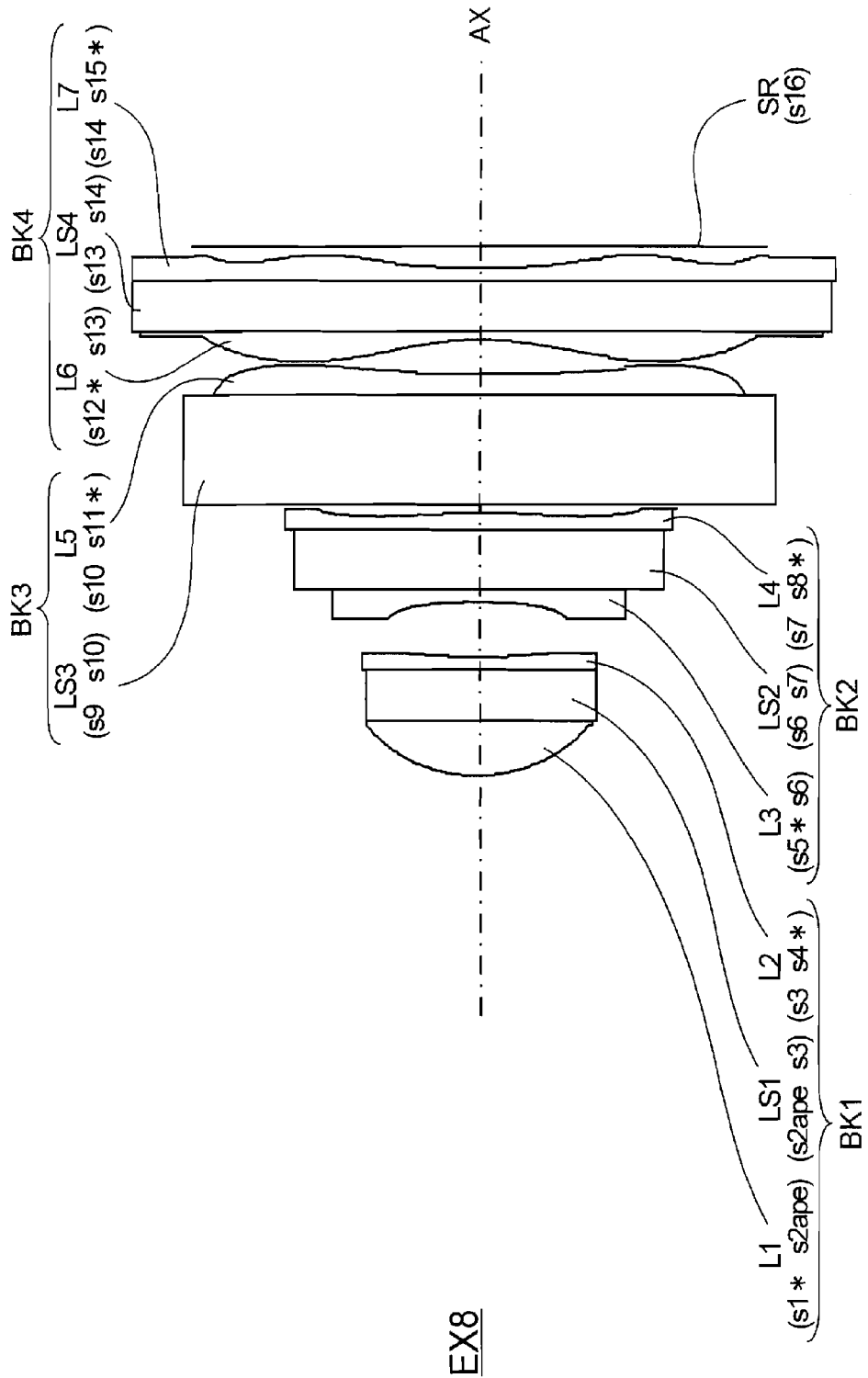

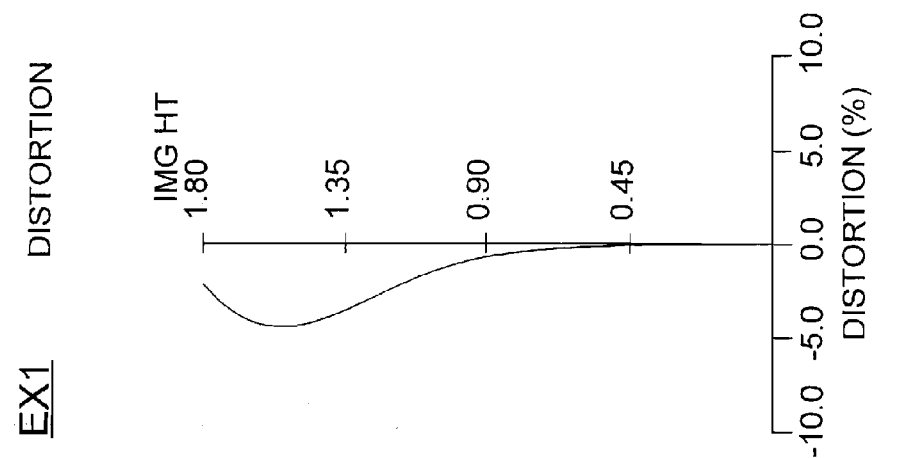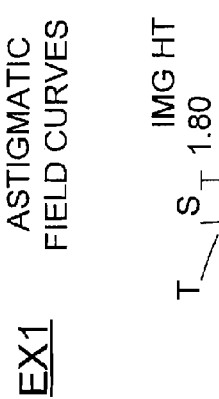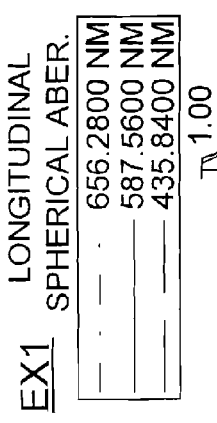

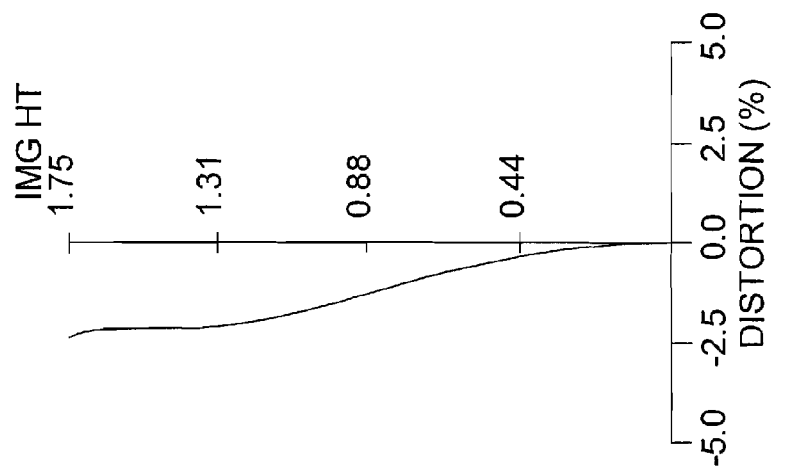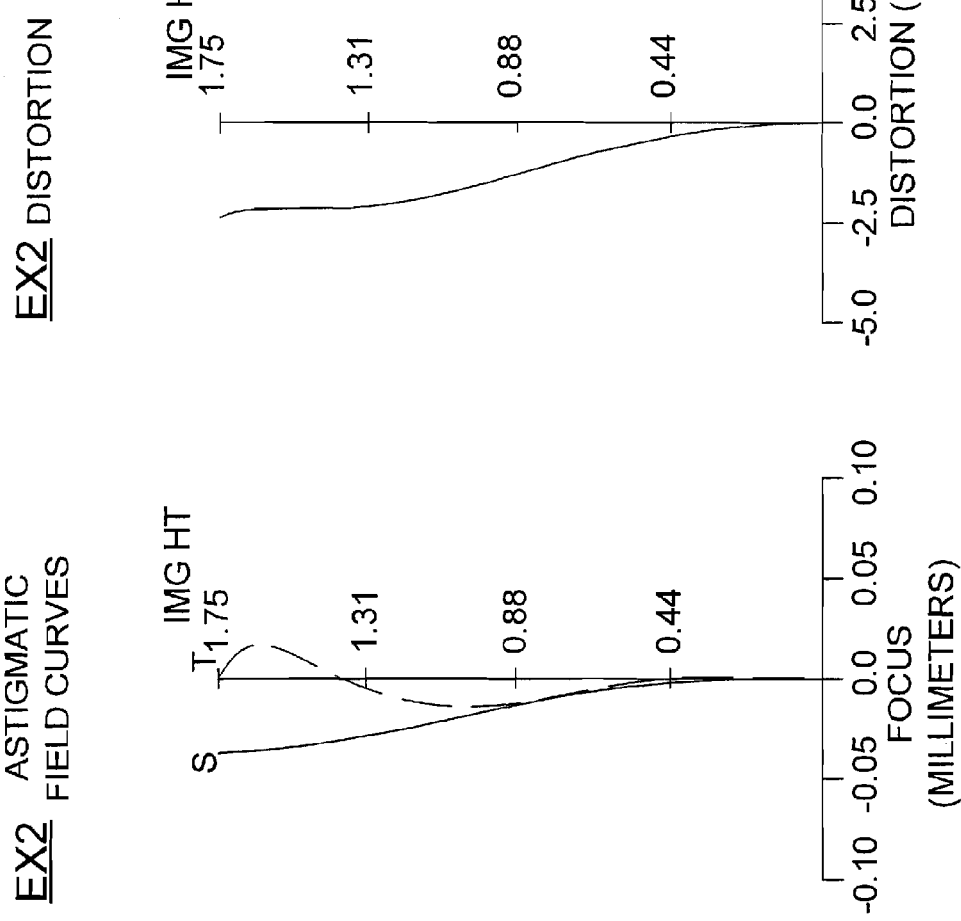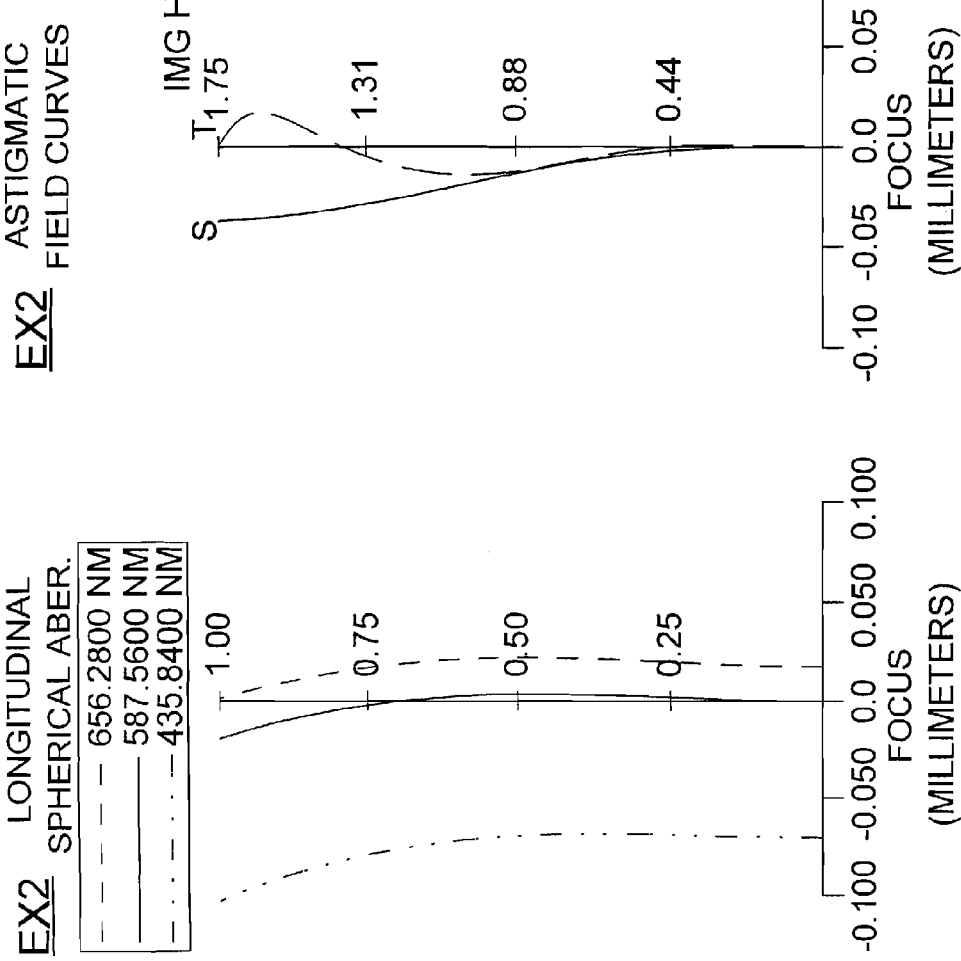

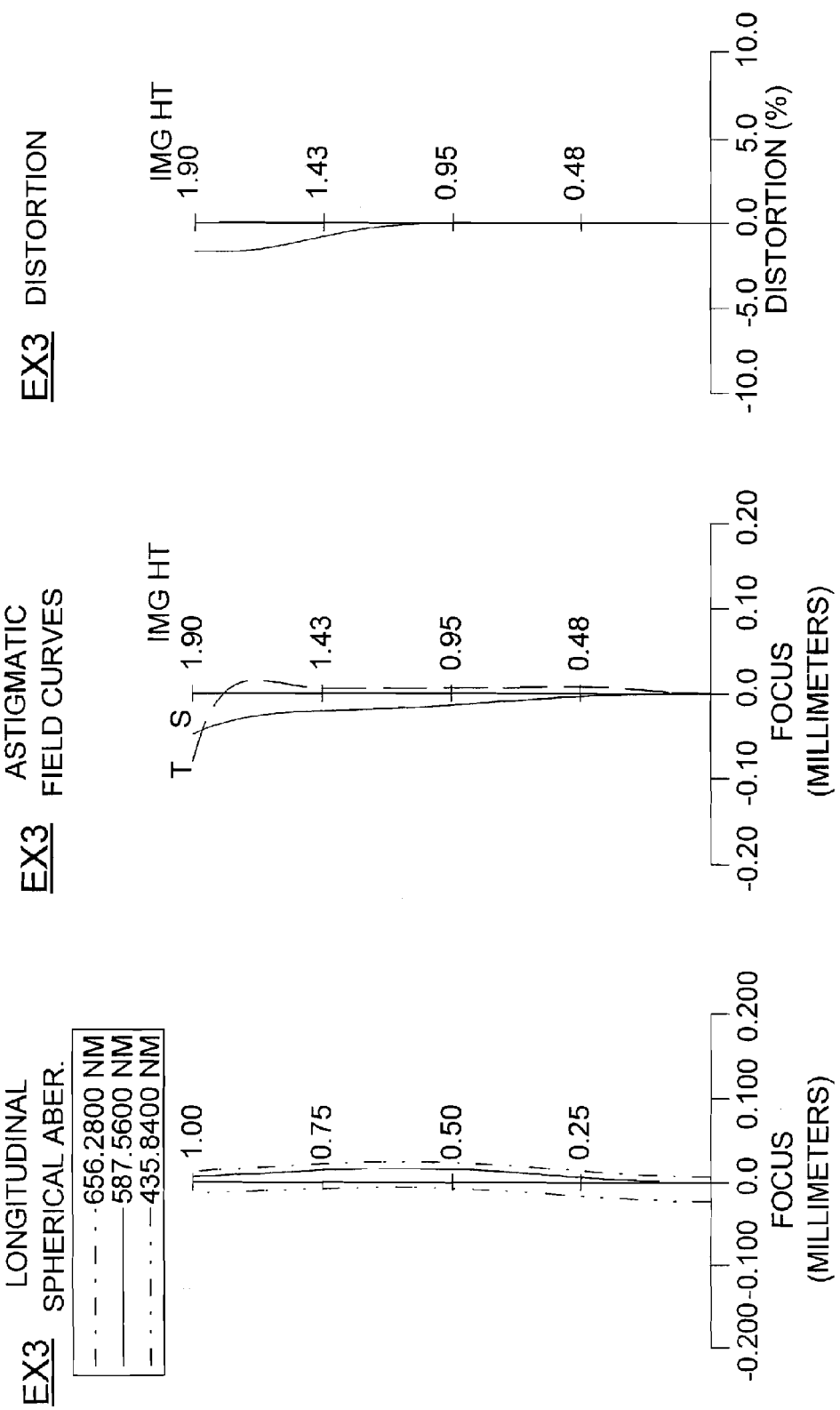

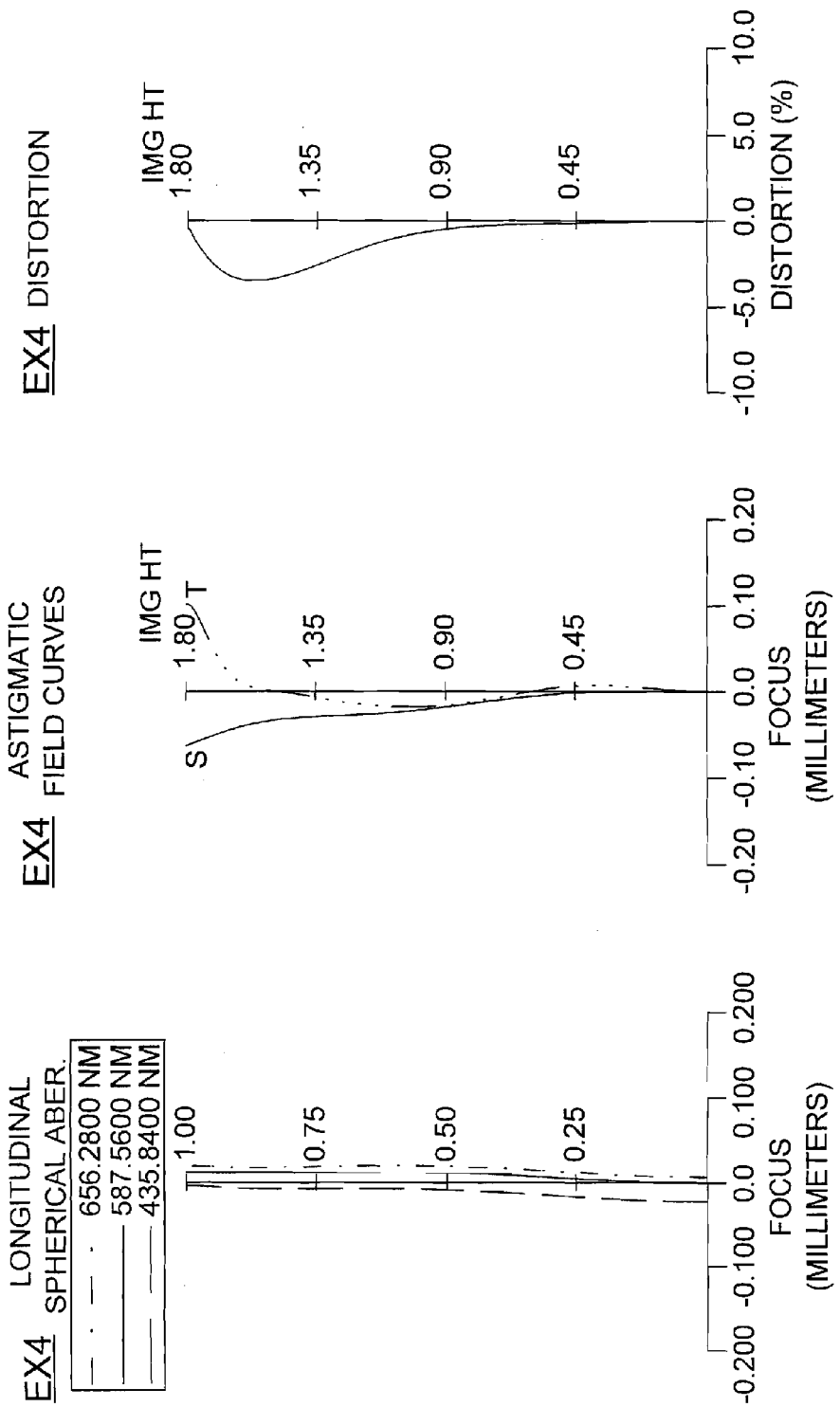

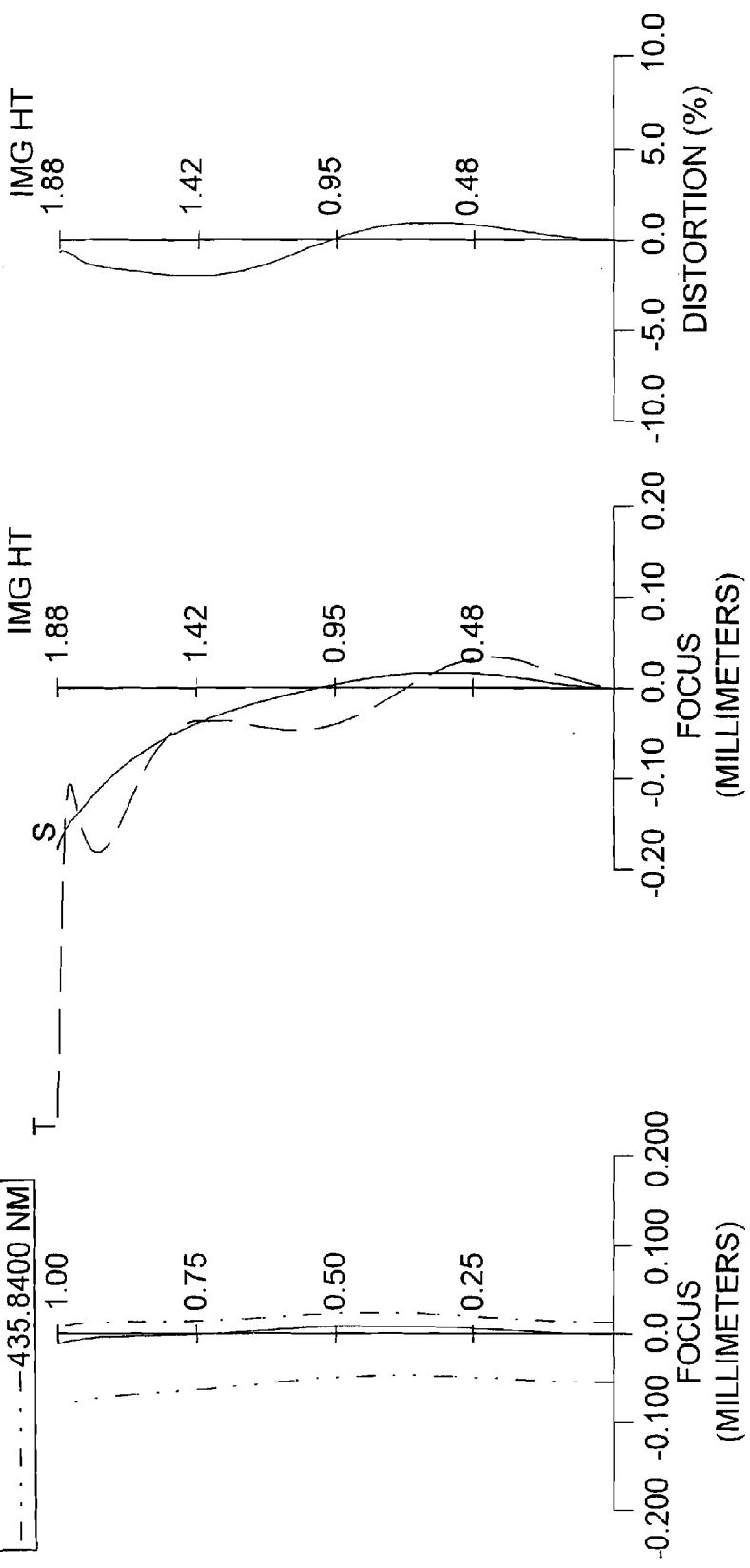

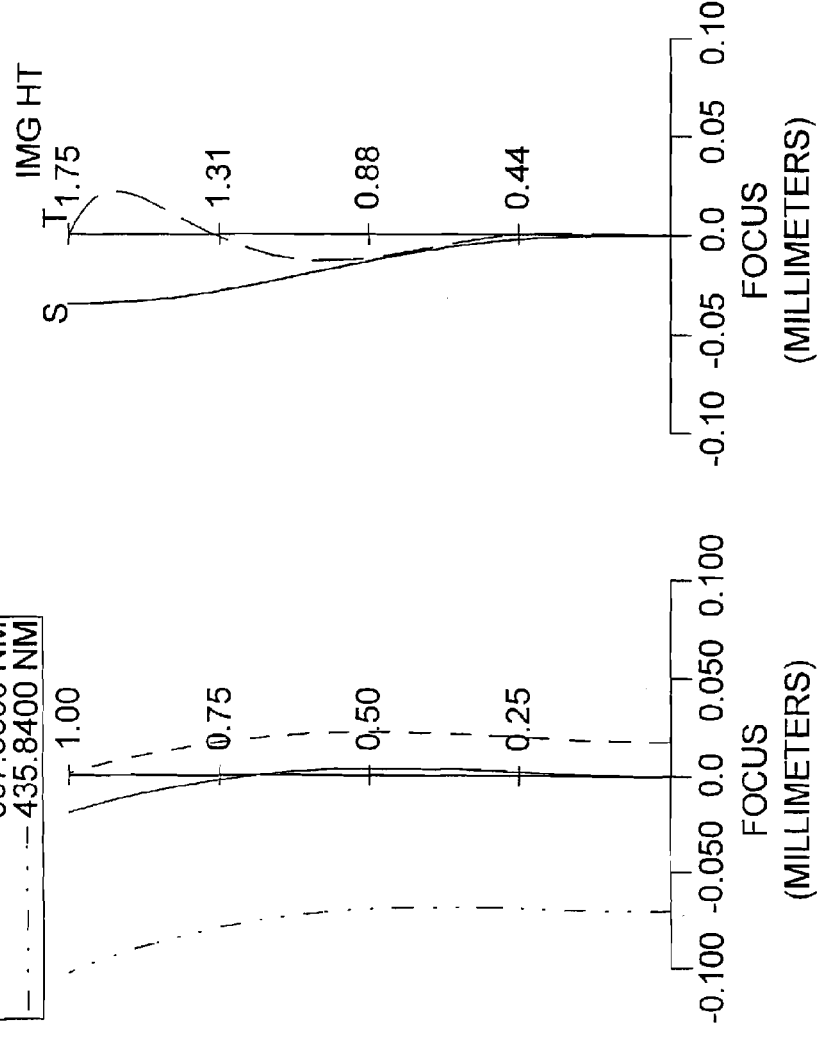
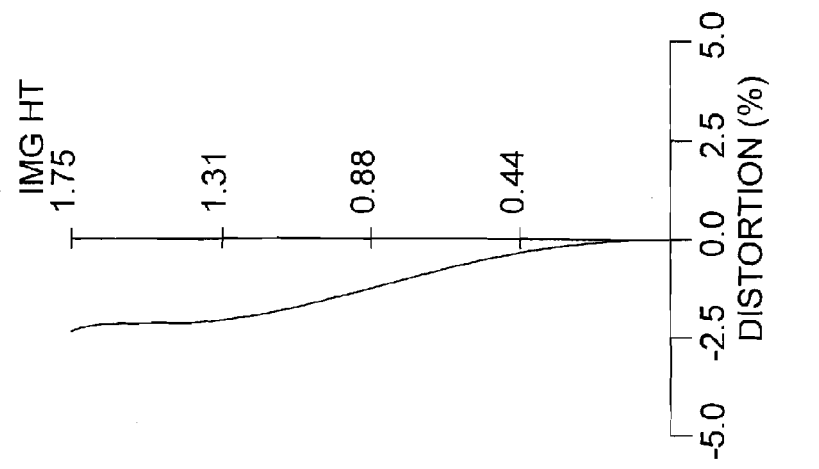

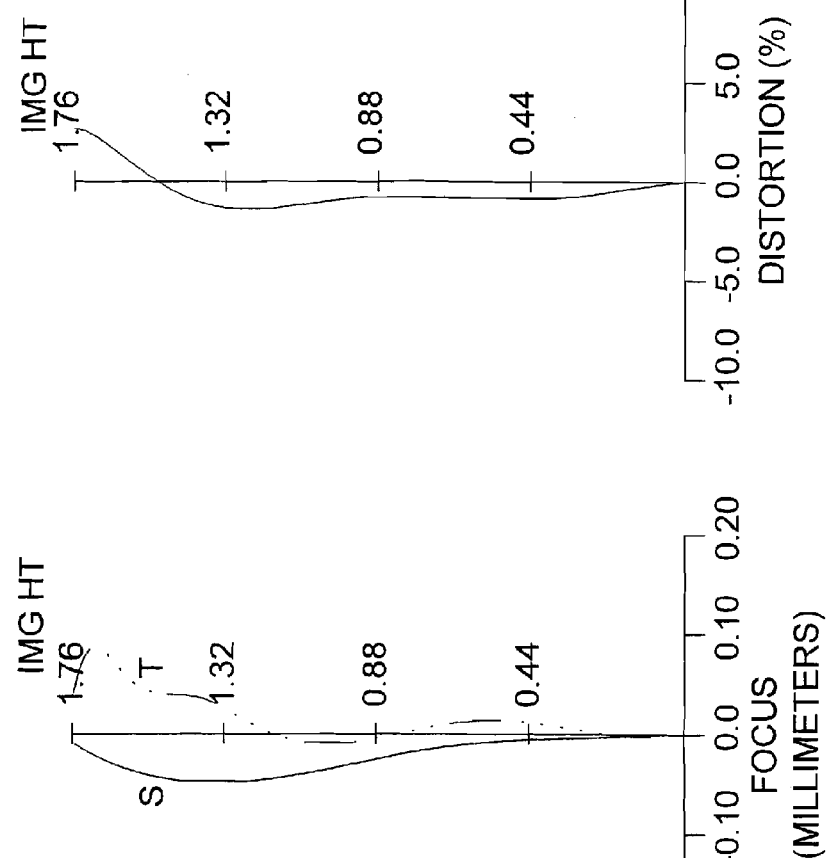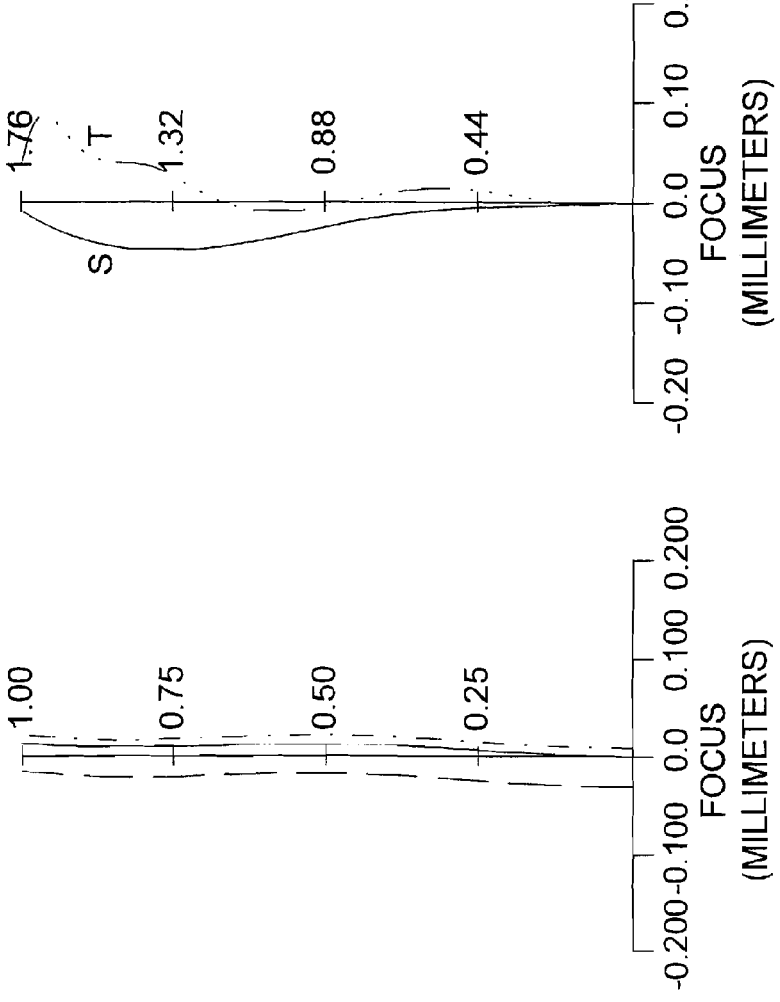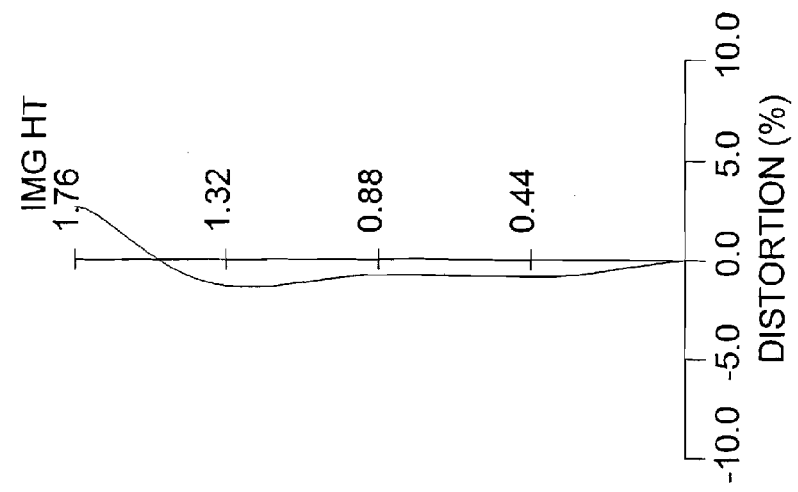

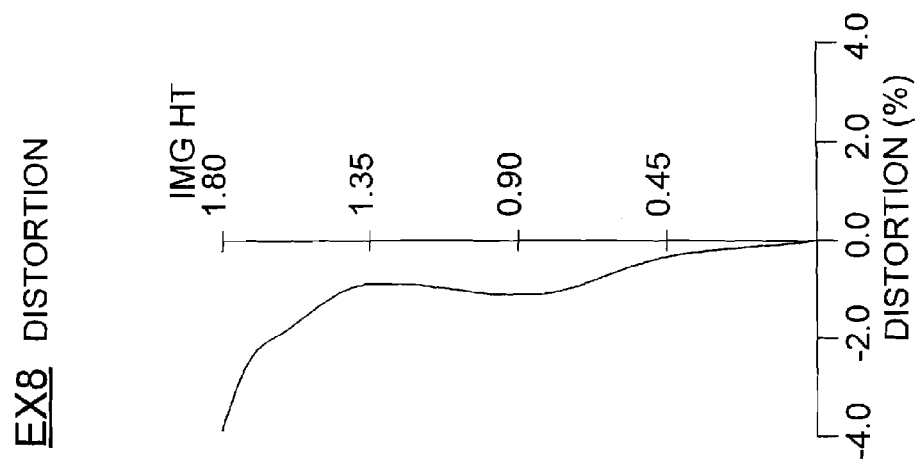
FIG. 16C EX8 DISTORTION
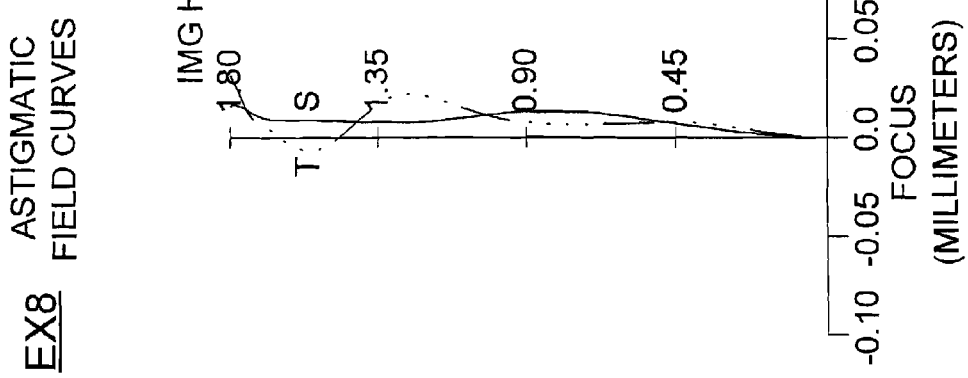
FIG. 16B EX8 ASTIGMATIC FIELD CURVES
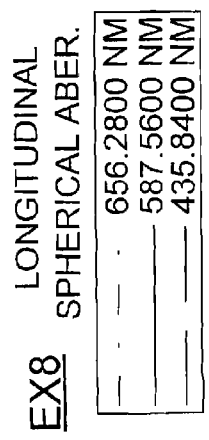
FIG. 16A EX8 LONGITUDINAL SPHERICAL ABER.

IMAGING LENS, IMAGING DEVICE, PORTABLE TERMINAL, AND METHOD FOR MANUFACTURING IMAGING LENS

RELATED APPLICATIONS

This application is a U.S. National Stage Application under 35 U.S.C. 371 of International Application No. PCT/JP2008/052762, filed with the Japanese Patent Office on Feb. 19, 2008. The present application is based on Japanese Patent Application No. 2007-038221, filed Feb. 19, 2007, the contents whereof have been incorporated herein by reference.

TECHNICAL FIELD

The present invention relates to an imaging lens, an imaging device, a portable terminal, and a method for manufacturing an imaging lens.

BACKGROUND ART

These days, compact, slim imaging devices are incorporated in compact, slim electronic appliances called portable terminals (for example, cellular phones, PDAs (personal digital assistants), etc.). Between such a portable terminal and, for example, an electronic appliance at a remote location, information such as sound information and image information is transferred bidirectionally.

Image sensors used in imaging devices are, for example, solid-state image sensors such as CCD (charge-coupled device) image sensors and CMOS (complementary metal-oxide semiconductor) image sensors. Nowadays, as imaging lenses for forming a subject image on those image sensors, lenses made of resin are used that can be mass-produced inexpensively and that thus contribute to cost reduction.

As such imaging lenses, in particular as imaging lenses used in imaging devices (so-called camera modules) incorporated in portable terminals, there are widely known those comprising three plastic lenses and those comprising one glass lens and two plastic lenses. Inconveniently, however, these imaging lenses do not promise easy compatibility between further size reduction and higher mass-producibility due to technical limitations.

As one measure to overcome this inconvenience, Patent Document 1 listed below deals with the replica method. The replica method is a method for forming a large number of lenses (lens elements) on a single lens substrate (wafer). A lens substrate (lens unit) including a plurality of lenses formed by this method arranged in an array is first joined to image sensors in the shape of a wafer (sensor wafer) and is then split. In the lens unit so split, the imaging lens corresponding to an imaging sensor is referred to as a wafer scale lens (cemented compound lens), and the module including the wafer scale lens and the imaging sensor is referred to as a wafer scale camera module.

And Patent Document 1 discloses an imaging lens including a wafer scale lens (an optical element having a lens contiguous with at least one substrate surface of the lens substrate; also referred to as a lens block) formed by the replica method. Incidentally, in the wafer scale lens in this imaging lens, a diffractive surface and a refractive surface are formed simultaneously on a lens substrate, so that with those surfaces the imaging lens corrects chromatic aberration.

Patent Document 1: JP-A-2006-323365

DISCLOSURE OF THE INVENTION

Problems to be Solved by the Invention

However, it is not easy to simultaneously form a diffractive surface and a refractive surface on a lens substrate as in the imaging lens disclosed in Patent Document 1. In particular, in a lens system with a comparatively short optical total length (the distance, in a lens system, from the most object-side entrance surface to the imaging surface of an imaging sensor), the refractive surface is extremely thin at its center, and this makes the formation of a wafer scale lens more difficult.

In an imaging lens including a diffractive surface, the diffraction efficiency with light of wavelengths other than the design wavelength tends to be low. Furthermore, if the diffractive surface has poor angular characteristics with the light incident thereon, the angle of incidence of that light with respect to the diffractive surface is restricted, and thus the imaging lens cannot have a wide angle of view. In the imaging lens disclosed in Patent Document 1, the second lens block located second from the object side is a convex surface, and this leads to a larger Petzval sum.

Moreover, even such a wafer scale lens needs to have optical performance comparable with that of a conventional normal lens system (normal lens) formed of glass or resin. However, in a case where a wafer scale lens needs to include a meniscus shape from the viewpoint of optical performance (such as aberration correction), the wafer scale lens, which includes a lens substrate, needs to have an increased thickness along the optical axis. As a result, the wafer scale lens, and hence the imaging lens, tends to have an increased length.

Nowadays, a camera module, together with an IC chip and the like, is fitted on a printed circuit board having solder paste printed on it, and is then heated (for reflow soldering); thereby the module is mounted on the printed circuit board. Such mounting allows inexpensive mass-production of various devices including the camera module. Thus, recent imaging lenses need to be heat-resistant enough to withstand reflow soldering.

The present invention has been made in view of the foregoing, and an object of the present invention is to provide an imaging lens etc. that help
 reduce the optical total length relative to the image height without inclusion of a diffractive surface or the like, despite including fewer lens blocks,
 achieve satisfactory aberration correction, and
 reduce costs.

Means for Solving the Problem

According to one aspect of the present invention, an imaging lens includes at least three lens blocks each including a lens substrate that is a plane-parallel plate and a lens contiguous with at least one of object-side and image-side substrate surfaces of said lens substrate, the lens exerting a positive or negative optical power. The imaging lens also includes an aperture stop that restricts light amount.

The lens blocks included in this imaging lens are given numbers, namely first to fourth, according to their place in order as counted from the object side to the image side. The lens substrates included in these lens blocks are given numbers, namely first to fourth, likewise. The lenses L in the lens blocks are each referred to as the lens L on the object side (o) or image side (m) of a given lens substrate LS (one of a first lens substrate LS1 to a fourth lens substrate LS4), specifically the lens L[LS1o], the lens L[LS1m], the lens L[LS2o], the lens L[LS2m], the lens L[LS3o], the lens L[LS3m], the lens L[LS4o], and the lens L[LS4m].

The construction of the above imaging lens will now be described in more detail below. That is, in the imaging lens, the lenses included in the lens blocks are formed of a material different from a material of which the lens substrates are formed, and the lens blocks comprise a first lens block disposed at a most object-side position. The first lens block includes the first lens substrate and the lens L[LS1o] contiguous with an object-side substrate surface of the first lens substrate, and an object-side lens surface of this lens L[LS1o] is convex to the object side.

Furthermore, in the imaging lens, the lens blocks comprise a second lens block disposed to an image side of the first lens block. The second lens block includes the second lens substrate and the lens L[LS2o] contiguous with an object-side substrate surface of the second lens substrate, and an object-side lens surface of the lens L[LS2o] is concave to the object side.

Furthermore, in the imaging lens, the lens blocks comprise a third lens block disposed to an image side of the second lens block. The third lens block includes the third lens substrate and a lens contiguous with at least one of an object-side and an image-side substrate surface of the third lens substrate, the at least one lens being the lens L[Ls3o] if contiguous with the object-side substrate surface of the third lens substrate, and the lens being the lens L[Ls3m] if contiguous with the image-side substrate surface of the third lens substrate. And, at least one of an object-side lens surface of the lens L[ls3o] and an image-side lens surface of the lens L[LS3m] is aspherical.

According to the present invention, it is preferable that, in the imaging lens, the first lens block exert a positive optical power and that conditional formula (B1) below be fulfilled.

$$0.6 \leq f[L[LS1o]o]/f[all] \leq 2.0 \tag{B1}$$

where f[L[LS1o]o] represents a focal length of an object-side lens surface of the lens L[LS1o]; and f[all] represents a focal length of the entire imaging lens.

According to the present invention, it is preferable that, in the imaging lens, conditional formula (B2) below be fulfilled.

$$1 < N[LS1]/N[L[LS1o]] \tag{B2}$$

where

N[LS1] represents an index of refraction of the first lens substrate; and

N[L[LS1o]] represents an index of refraction of the lens L[LS1o].

According to the present invention, it is preferable that, in the imaging lens, conditional formula (B3) below be fulfilled.

$$\nu[LS1] \leq 50 \tag{B3}$$

where

ν[LS1] represents an Abbe number of the first lens substrate.

According to the present invention, it is preferable that, in the imaging lens, conditional formulae (B4) and (B5) below be fulfilled.

$$N[LS1]/N[L[LS1o]] < 1 \tag{B4}$$

$$40 \leq \nu[LS1] \tag{B5}$$

where

N[LS1] represents an index of refraction of the first lens substrate;

N[L[LS1o]] represents an index of refraction of the lens L[LS1o]; and

ν[LS1] represents an Abbe number of the first lens substrate.

According to the present invention, it is preferable that, in the imaging lens, conditional formula (B6) below be fulfilled.

$$0.03 \leq d[LS1]/TL \leq 0.33 \tag{B6}$$

where d[LS1] represents a thickness of the first lens substrate along an optical axis, and TL represents a distance from a most object-side surface in the imaging lens to the imaging surface along the optical axis.

According to the present invention, it is preferable that, in the imaging lens, conditional formulae (B7) and (B8) below be fulfilled.

$$TL/Y' \leq 2.06 \tag{B7}$$

$$Ar/TL \leq 0.5 \tag{B8}$$

where

TL represents a distance from a most object-side surface in the imaging lens to the imaging surface along the optical axis;

Y' represents a maximum image height; and

Ar represents a sum of aerial distances between adjacent lens blocks in the imaging lens (including a thickness of any optical element having no optical power other than a lens block, as given as an equivalent thickness in air).

According to the present invention, it is preferable that, in the imaging lens, conditional formula (B9) below be fulfilled.

$$-2.0 \leq r[L[LS2o]o]/f[all] \leq -0.35 \tag{B9}$$

where r[L[LS2o]o] represents the paraxial radius of curvature of the object-side lens surface of the lens L[LS2o]; and f[all] represents a focal length of the entire imaging lens.

According to the present invention, it is preferable that, in the imaging lens, the lens substrates be formed of glass.

According to the present invention, it is preferable that, in the imaging lens, the lenses be formed of resin.

According to the present invention, it is preferable that the resin of which said lens is formed have inorganic fine particles with a particle diameter of 30 nm or less dispersed therein.

According to the present invention, it is preferable that the resin mentioned above be a hardening resin.

It can be said that the present invention includes, as another aspect thereof, an imaging device comprising the imaging lens described above and an image sensor sensing light passing through the imaging lens. Furthermore, it can be said that the present invention includes, as another aspect thereof, a portable terminal comprising the imaging device.

According to another aspect of the present invention, it is preferable that a method of manufacturing the imaging lens described above comprise the following steps, let a unit including, as said lens block, a plurality of lens blocks arranged in an array be called a lens block unit: a joining step of arranging a spacer at least at part of a peripheral edge of the lens blocks and joining the plurality of lens block units together; and a cutting step of cutting the joined-together lens block units along the spacer.

ADVANTAGES OF THE INVENTION

According to the present invention, an imaging lens includes at least three lens blocks; here, with the object-side lens surface of an object-side convex lens L[LS1o] in the first lens block and the object-side lens surface of an object-side concave lens L[LS2o] in a second lens block, and in addition with at least one of the object-side aspherical lens surface of a lens L[LS3o] in the third lens block and the image-side aspherical lens surface of a lens L[LS3m] in the third lens block, the Petzval sum is reduced, and aberrations of various kinds are corrected (in short, the imaging lens has satisfactory aberration correction performance). Thus, the imaging lens is manufactured easily and hence inexpensively.

BRIEF DESCRIPTION OF DRAWINGS

FIG. 7 is an optical sectional view of the imaging lens of Example 7;
FIG. 8 is an optical sectional view of the imaging lens of Example 8;
FIG. 9A is a spherical aberration diagram of the imaging lens of Example 1;
FIG. 9B is an astigmatism diagram of the imaging lens of Example 1;
FIG. 9C is a distortion diagram of the imaging lens of Example 1;
FIG. 10A is a spherical aberration diagram of the imaging lens of Example 2;
FIG. 10B is an astigmatism diagram of the imaging lens of Example 2;
FIG. 10C is a distortion diagram of the imaging lens Example 2;
FIG. 11A is a spherical aberration diagram of the imaging lens of Example 3;
FIG. 11B is an astigmatism diagram of the imaging lens of Example 3;
FIG. 11C is a distortion diagram of the imaging lens of Example 3;
FIG. 12A is a spherical aberration diagram of the imaging lens of Example 4;
FIG. 12B is an astigmatism diagram of the imaging lens of Example 4;
FIG. 12C is a distortion diagram of the imaging lens of Example 4;
FIG. 13A is a spherical aberration diagram of the imaging lens of Example 5;
FIG. 13B is an astigmatism diagram of the imaging lens of Example 5;
FIG. 13C is a distortion diagram of the imaging lens of Example 5;
FIG. 14A is a spherical aberration diagram of the imaging lens of Example 6;
FIG. 14B is an astigmatism diagram of the imaging lens of Example 6;
FIG. 14C is a distortion diagram of the imaging lens of Example 6;
FIG. 15A is a spherical aberration diagram of the imaging lens of Example 7;
FIG. 15B is an astigmatism diagram of the imaging lens of Example 7;
FIG. 15C is a distortion diagram of the imaging lens of Example 7;
FIG. 16A is a spherical aberration diagram of the imaging lens of Example 8;
FIG. 16B is an astigmatism diagram of the imaging lens of Example 8;
FIG. 16C is a distortion diagram of the imaging lens of Example 8.

| List of Reference Symbols | |
|---|---|
| BK | Lens block |
| L | Lens |
| LS | Lens substrate |
| ape | Aperture stop |
| s | Lens surface, substrate surface |
| * | Aspherical surface |
| PT | Plane-parallel plate |
| LN | Imaging lens |
| SR | Image sensor |
| IM | Image surface (optical image) |
| SS | Sensing surface |
| AX | Optical axis |
| LU | Imaging device |
| CU | Portable terminal |
| 1 | Signal processor |
| 2 | Controller |
| 3 | Memory |
| 4 | Operated portion |
| 5 | Display portion |

BEST MODE FOR CARRYING OUT THE INVENTION

Embodiment 1

[■ Imaging Device and Portable Terminal]

Typically, imaging lenses are suitably used in digital appliances (for example, portable terminals) equipped with an image capturing capability. This is because a digital appliance including a combination of an imaging lens, an image sensor, etc. functions as an imaging device that optically takes in an image of a subject and outputs it in the form of an electrical signal.

An imaging device is a main component (optical device) of a camera that shoots still and moving images of a subject, and includes, for example, from the object (i.e. subject) side thereof, an imaging lens that forms an optical image of an object and an image sensor that converts the optical image formed by the imaging lens into an electrical signal.

Examples of cameras include digital cameras, video cameras, monitoring cameras, vehicle-mounted cameras, and videophone cameras. Cameras may also be incorporated in, or externally fitted to, personal computers, portable terminals (for example, compact, portable information appliance terminals such as cellular phones and mobile computers), peripheral appliances (scanners, printers, etc.) for those, other digital appliances, etc.

As these examples suggest, incorporation of an imaging device is not limited to building of cameras; incorporation of an imaging device allows building of a variety of appliances equipped with camera capabilities, for example building of digital appliances equipped with an image capturing capability, such as camera phones.

Figure 17:
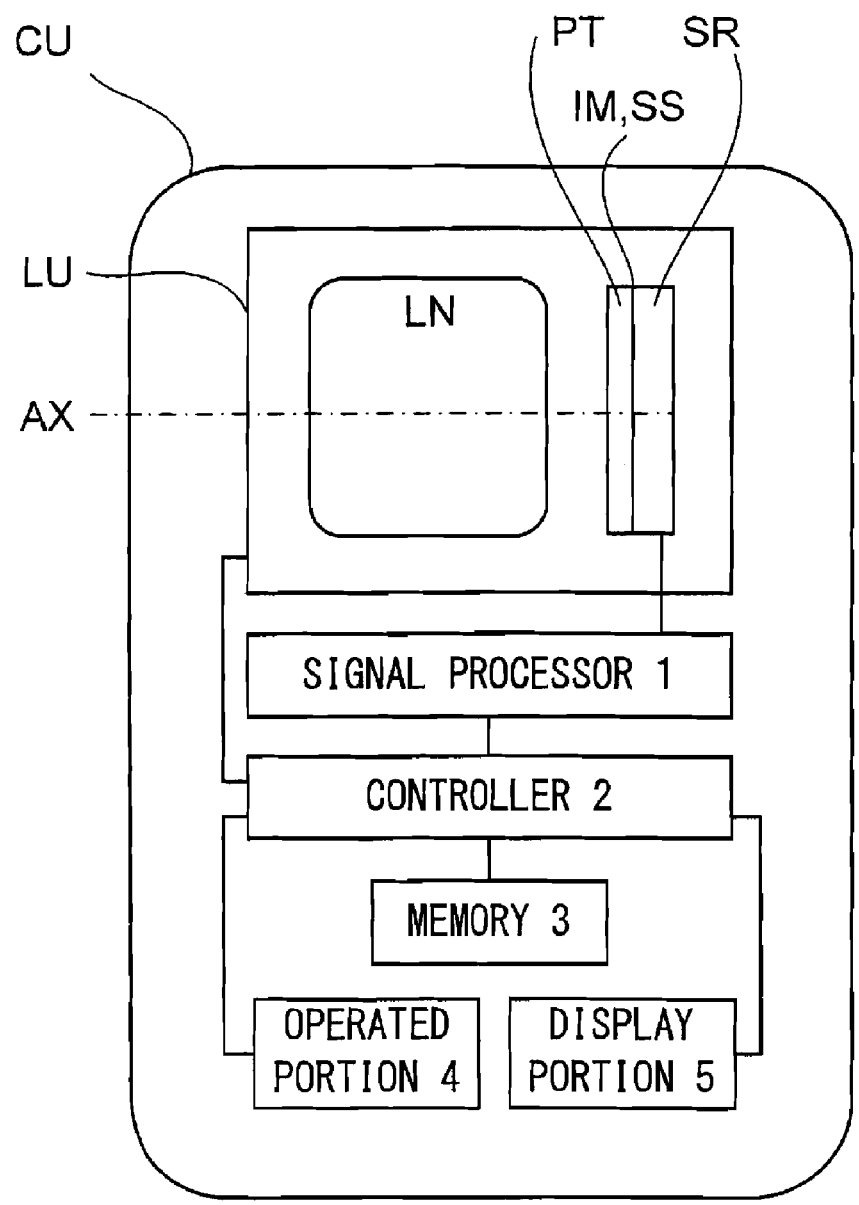
FIG. 17 is a block diagram of a portable terminal.

FIG. 17 is a block diagram of a portable terminal CU as one example of a digital appliance equipped with an image capturing capability. The portable terminal CU shown in this figure incorporates an imaging device LU, which includes an imaging lens LN, a plane-parallel plate PT, and an image sensor SR.

The imaging lens LN forms, from the object (i.e. subject) side thereof, an optical image (image surface) IM of an object. More specifically, the imaging lens LN includes, for example, a lens block BK (which will be described in detail later), and forms the optical image IM on a sensing surface SS of the image sensor SR.

Here, the optical image IM to be formed by the imaging lens LN passes through, for example, an optical low-pass filter (in FIG. 17, the plane-parallel plate PT) having a predetermined cut-off frequency characteristic determined by the pixel pitch of the image sensor SR. While passing there the optical image IM has its spatial frequency characteristic adjusted so as to minimize the so-called aliasing noise occurring when it is converted into an electrical signal.

The adjustment of the spatial frequency characteristic here helps reduce color moiré. In cases where the performance expected around the resolution limit frequency is modest, however, no noise occurs even without use of an optical low-pass filter. Likewise, in cases where a user shoots or watches images by use of a display system (for example, the liquid crystal display of a cellular phone etc.) on which noise is less noticeable, there is no need for an optical low-pass filter.

The plane-parallel plate PT is one or more optical filters, such as an optical low-pass filter and an infrared cut filter, that are arranged as necessary (the plane-parallel plate PT may correspond to the cover glass or the like of the image sensor SR).

The image sensor SR converts the optical image IM formed on the sensing surface SS by the imaging lens LN into an electrical signal. Used here is, for example, an image sensor (solid-state image sensor), such as a CCD (charge-coupled device) image sensor or CMOS (complementary metal-oxide semiconductor) image sensor. The imaging lens LN is so located as to form the optical image IM of the subject on the sensing surface SS of the image sensor SR. Thus the optical image IM formed by the imaging lens LN is efficiently converted into an electrical signal by the image sensor SR.

When an imaging device LU like this is incorporated in a portable terminal CU equipped with an image capturing capability, the imaging device LU is typically arranged inside the body of the portable terminal CU. When the camera capabilities of the portable terminal CU are used, the imaging device LU is brought into a desired state. For example, an imaging device LU provided as a unit may be designed to be detachable from, or freely rotatable relative to, the main unit of a portable terminal CU.

The portable terminal CU includes, in addition to the imaging device LU, a signal processor 1, a controller 2, a memory 3, an operated portion 4, and a display portion 5.

The signal processor 1 subjects the signal generated by the image sensor SR to predetermined digital image processing and image compression processing as necessary. The so processed signal is then recorded, as a digital video signal, to the memory 3 (a semiconductor memory, optical disk, or the like), and/or is transferred to an external device across a cable or after being converted into an infrared signal.

The controller 2 is a microcomputer, and governs, in a concentrated fashion, functional control for shooting and playing back images etc., more specifically for controlling a lens movement mechanism for focusing etc. For example, the controller 2 controls the imaging device LU to shoot at least either a still or moving image of the subject.

The memory 3 stores, for example, the signal generated by the image sensor SR and then processed by the signal processor 1.

The operated portion 4 includes operated members such as operation buttons (for example, a shutter-release button) and an operation dial (for example, an operation mode dial), and transmits the information entered by an operator to the controller 2.

The display portion 5 includes a display such as a liquid crystal monitor, and displays images by use of the image signal resulting from the conversion by the image sensor SR, or by use of image information recorded in the memory 3.

[■ Imaging Lens]

Figure 1:
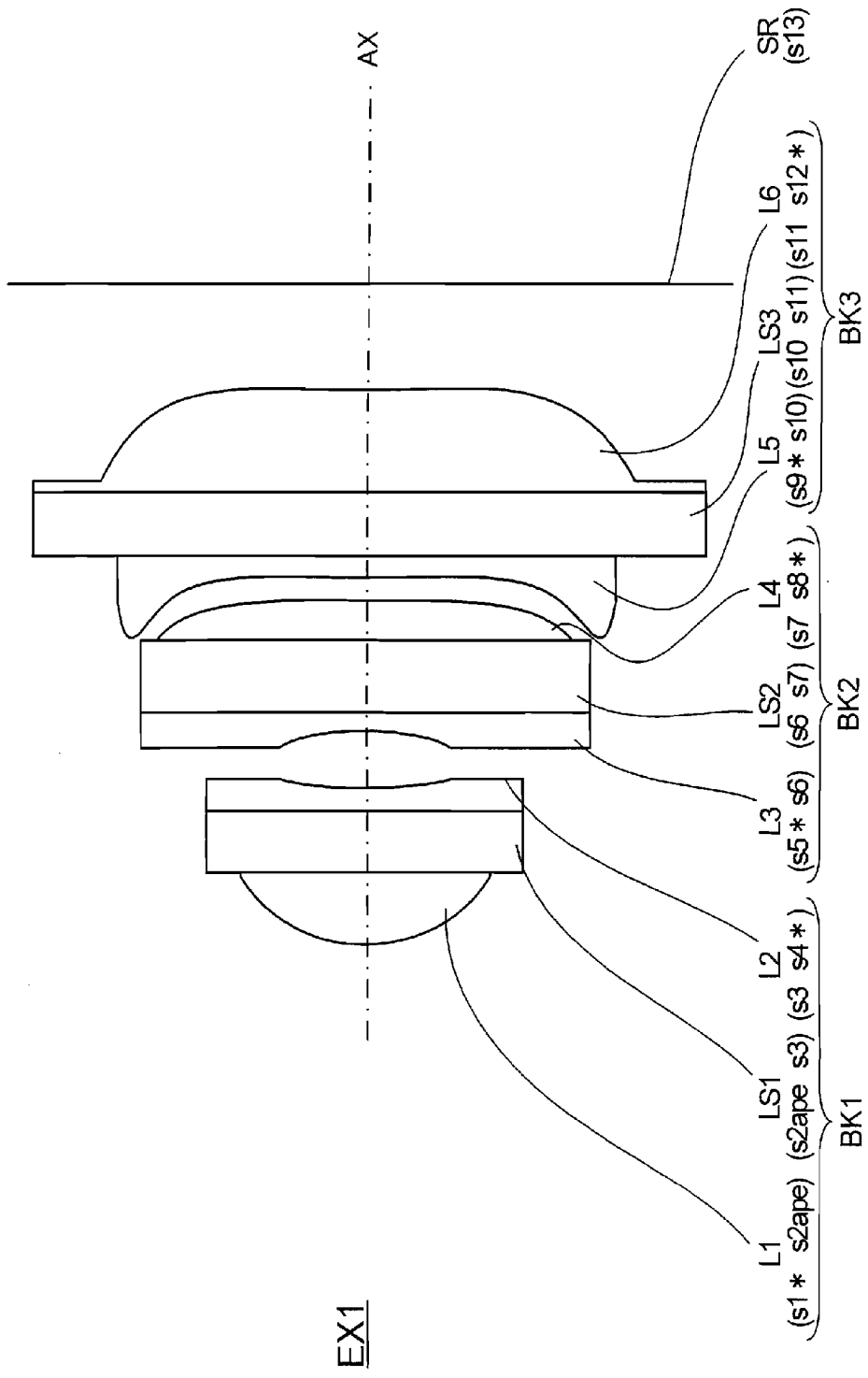
FIG. 1 is an optical sectional view of the imaging lens of Example 1.
Figure 2:
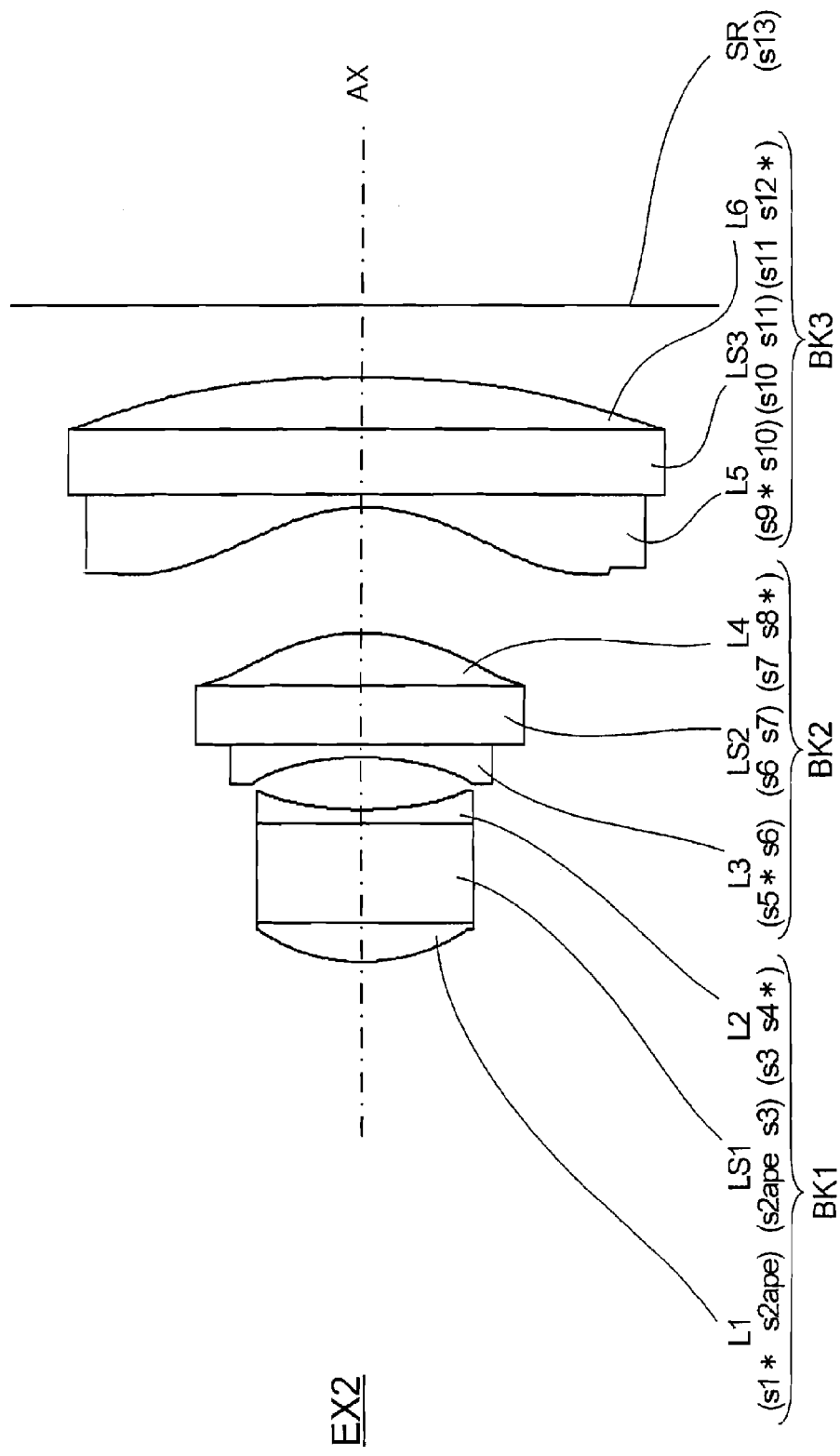
FIG. 2 is an optical sectional view of the imaging lens of Example 2.
Figure 3:
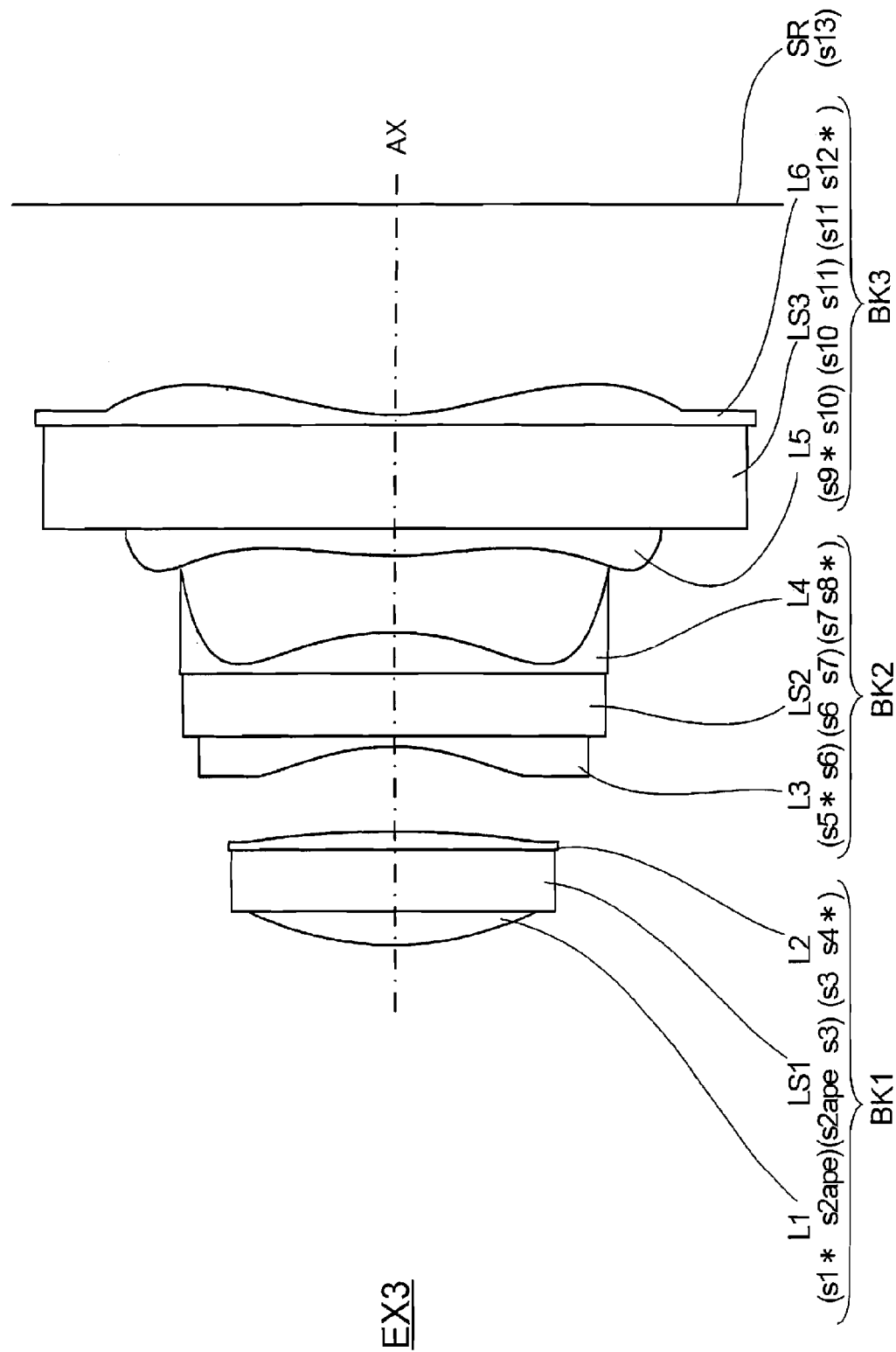
FIG. 3 is an optical sectional view s of the imaging lens of Example 3.
Figure 4:
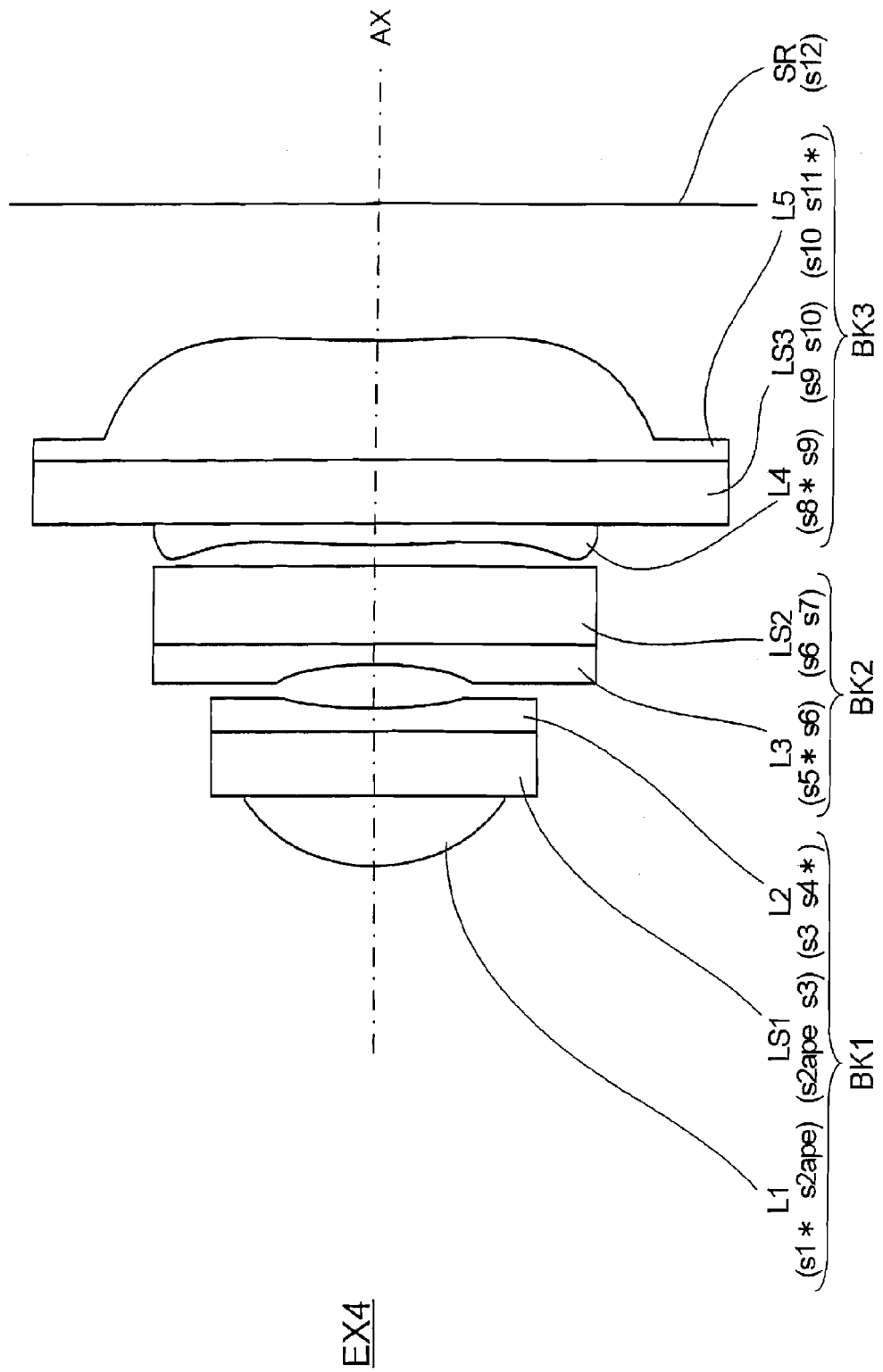
FIG. 4 is an optical sectional view of the imaging lens of Example 4.
Figure 5:
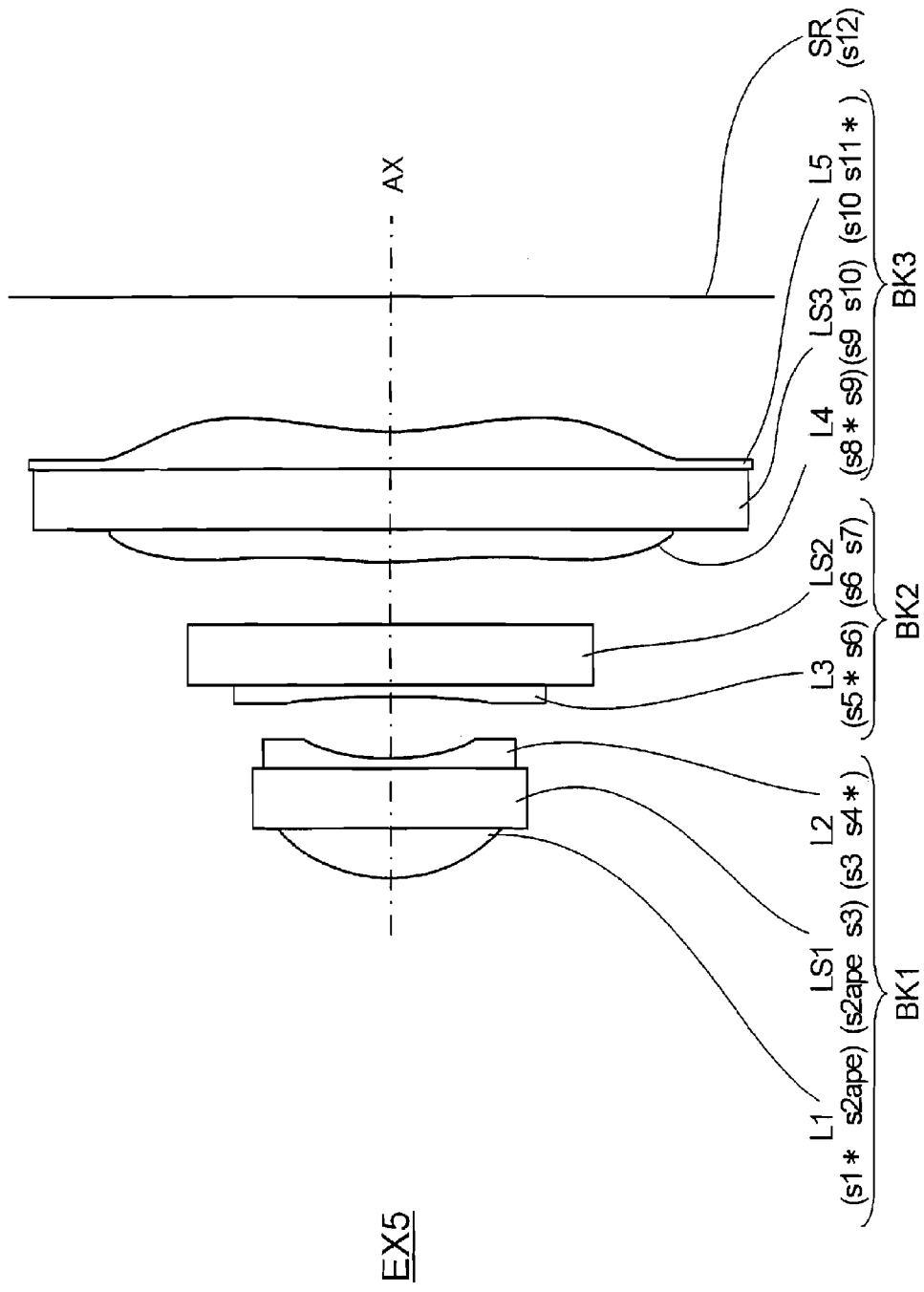
FIG. 5 is an optical sectional view of imaging lens of Example 5.
Figure 6:
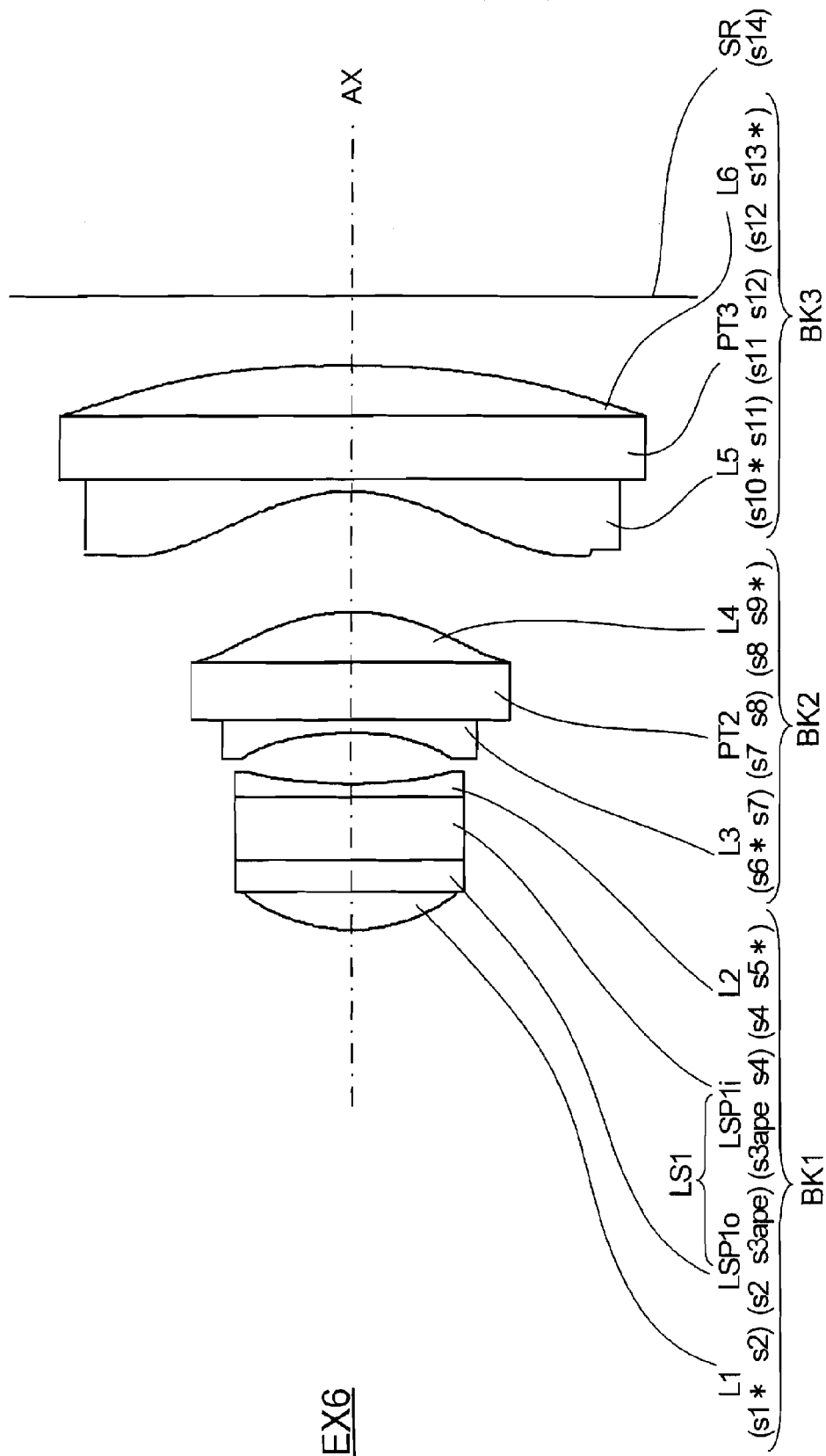
FIG. 6 is an optical sectional view of the imaging lens of Example 6.

Now, the imaging lens LN will be described in detail. The imaging lens LN includes a lens block BK having a plurality of optical elements that are contiguous with one another (see FIG. 1, which will be described later). This lens block (cemented compound lens) BK has a lens L contiguous with at least one of two opposite (object-side and image-side) substrate surfaces of a lens substrate LS (and the lens L exerts a positive or negative optical power).

Here, "contiguous with" denotes that the relevant substrate surface of the lens substrate LS and the lens L are directly bonded together, or are indirectly bonded together with another member in between.

[■ Manufacturing Method of an Imaging Lens]

Figure 18A:
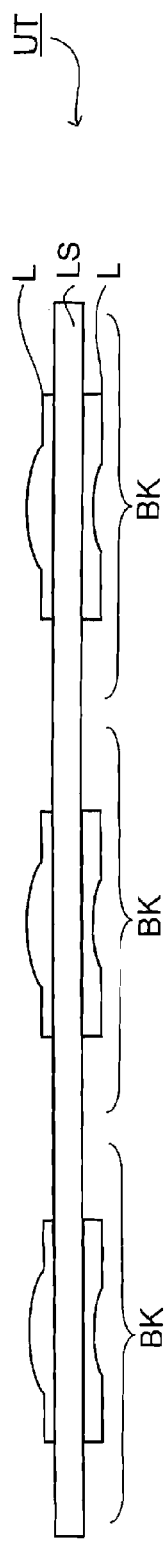
FIG. 18A is a sectional view of a lens block unit.

A lens block unit UT, like the one shown in a sectional view in FIG. 18A, including a plurality of lens blocks BK arranged side by side allows simultaneous fabrication of a large number of lenses L, and is manufactured inexpensively by the reflow method or by the replica method (a lens block unit UT may include one lens block BK, or may include a plurality of lens blocks BK).

According to the reflow method, a film of low-softening-point glass is formed on a glass substrate by CVD (chemical vapor deposition). The low-softening-point glass film so formed is then subjected to microprocessing by lithography and dry etching. It is then heated, so that the low-softening-point glass film melts into the shape of lenses. Thus, by the reflow method, a large number of lenses are fabricated simultaneously on a glass substrate.

On the other hand, according to the replica method, a hardening resin is molded into the shape of lenses by use of a mold and is transferred onto a lens wafer. Thus, by the replica method, a large number of lenses are fabricated simultaneously on a lens wafer.

Then, from lens block units UT manufactured by a method like those described above, the imaging lens LN is manufactured. An example of the manufacturing process of the imaging lens is shown in a schematic sectional view in FIG. 18B.

A first lens block unit UT1 is composed of a plane-parallel plate as a first lens substrate LS1, a plurality of first lenses L1 bonded to one surface of the first lens substrate LS1, and a plurality of second lenses L2 bonded to the other surface of the first lens substrate LS1.

A second lens block unit UT2 is composed of a plane-parallel plate as a second lens substrate LS2, a plurality of third lenses L3 bonded to one surface of the second lens substrate LS2, and a plurality of fourth lenses L4 bonded to the other surface of the second lens substrate LS2.

A spacer member (spacer) B1 in the shape of a lattice is interposed between the first and second lens block units UT1 and UT2 (specifically, between the first and second lens substrates LS1 and LS2) to keep constant the interval between the two lens block units UT1 and UT2. Another spacer member B1 is interposed between a substrate 2 and the second lens block unit 2 to keep constant the interval between the substrate 2 and the lens block unit UT2 (thus the spacer members B1 can be said to form a two-tier lattice). The lenses L are located in the eyes of the lattice of the spacer members B1.

The substrate B2 is a sensor chip package of a wafer scale including a microlens array, or a plane-parallel plate (corresponding to the plane-parallel plate PT in FIG. 17) such as a sensor cover glass or IR-cut filter.

Owing to the spacer members B1 being interposed between the first lens block unit UT1 and the first lens block unit UT2 and between the second lens block unit UT2 and the second substrate B2, the lens substrates LS (the first and second lens substrates LS1 and LS2) are sealed together to be integrated into a unit.

Figure 18B:
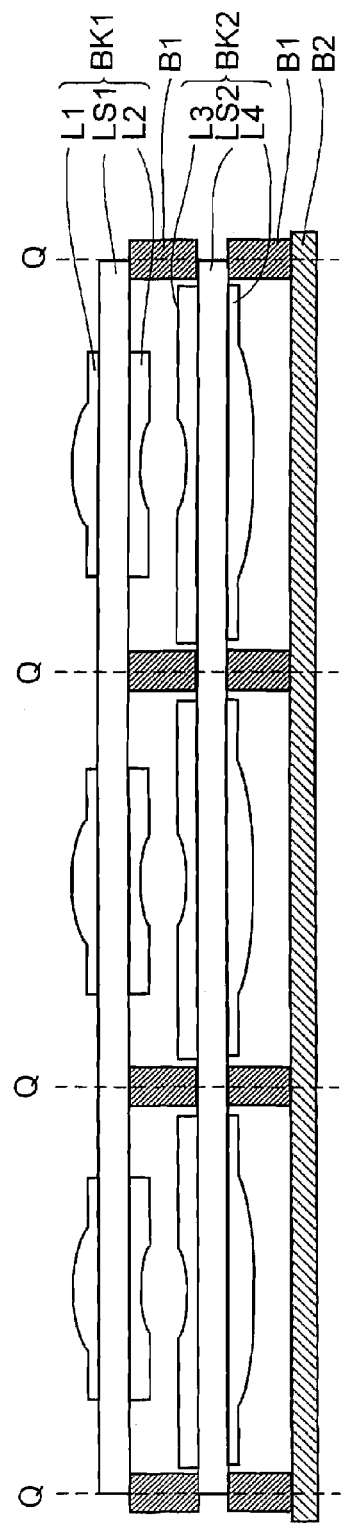
FIG. 18B is a sectional view showing a manufacturing process of an imaging lens.
Figure 18C:
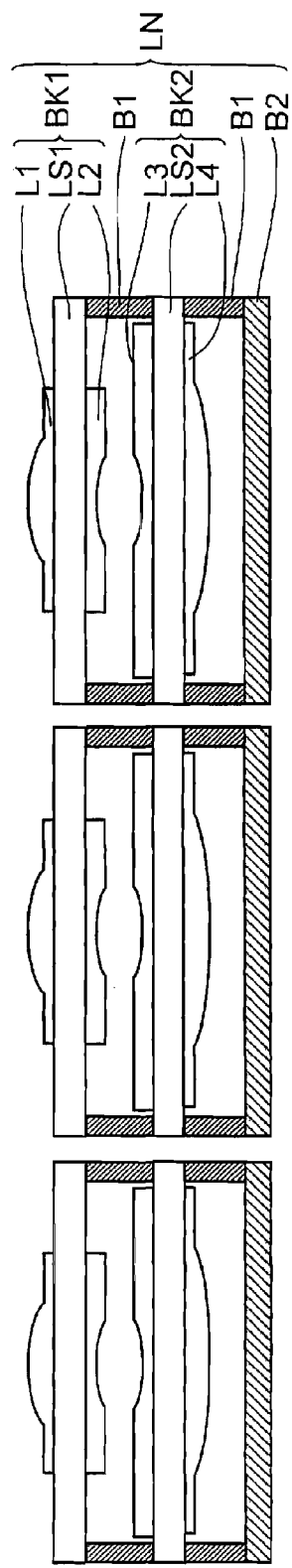
FIG. 18C is a sectional view showing imaging lenses.

The first lens substrate LS1, the second lens substrate LS2, the spacer members B1, and the substrate 2 thus integrated into a unit are then cut along the lattice frame of the spacer members B1 (at the positions indicated by broken lines Q); this produces a plurality of imaging lenses LN of a two-element construction as shown in FIG. 18C.

Manufacturing the imaging lens LN by cutting apart a member having a plurality of lens blocks BK (a first lens block BK1 and a second lens block BK2) built into it as described above eliminates the need for lens interval adjustment and assembly with each individual imaging lens LN. This makes it possible to mass-produce the imaging lens LN.

In addition, the spacer members B1 have the shape of a lattice. They thus serve as a guide that helps cut apart the imaging lens LN from the member having a plurality of lens blocks BK built into it. The imaging lens LN can thus be cut apart easily, without much time and trouble, from the member having a plurality of lens blocks BK built into it. This makes it possible to mass-produce the imaging lens inexpensively. This makes it possible to mass-produce the imaging lens inexpensively.

In light of the foregoing, the manufacturing method of the imaging lens LN includes a joining step in which a spacer member B1 is arranged at least at part of the peripheral edge of lens blocks BK and a plurality of lens block units UT are joined together with the spacer members B1 in between, and a cutting step in which the lens block units UT now joining to one another are cut apart along the spacer members B1. A manufacturing method like this is suitable for mass-production of inexpensive lens system.

[■ Lens Construction of an Imaging Lens]

Next, the lens construction of the imaging lens LN in different practical examples, namely Examples (EX) 1 to 8, will be described with reference to optical sectional diagrams in FIGS. 1 to 8.

The symbols used to identify the relevant members in optical sectional diagrams etc. are as follows:

Li represents a lens L;
LSi represents a lens substrate LS (in all practical examples, the lens substrate LS is a plane-parallel plate);
BKi represents a lens block;
PTi represents a plane-parallel plate (use of this symbol is limited to a plane-parallel plate with which no lens L is contiguous with);
si represents a lens surface or substrate surface;
i is a number suffixed as in "Li" to represent the place in order, among the members of the same kind, as counted from the object side to the image side;
* indicates an aspherical surface (a surface not adjoining a lens substrate LS but making contact with air is an aspherical surface);
ape represents an aperture stop; and
AX represents the optical axis.

A lens L suffixed with a number representing its place in order as counted from the object side to the image side may also be identified by an alternative expression. Specifically, with respect to a lens substrate LS (one of a first to a fourth lens substrate LS1 to LS4), a lens on the object side (o) thereof and a lens on the image side (m) thereof may alternatively be identified as a lens L[LS1o] and a lens L[LS1m], a lens L[LS2o] and a lens L[LS2m], a lens L[LS3o] and a lens L[LS3m], and a lens L[LS4o] and a lens L[LS4m], respectively.

●Example 1

In Example 1, the imaging lens LN includes three lens blocks BK1 to BK3 disposed in this order from the object side to the image side, and also includes an aperture stop ape.

The first lens block BK1 disposed at the most object-side position includes a first lens substrate LS1. A first lens L1 (lens L[LS1o]) is contiguous with the object-side substrate surface of the first lens substrate LS1, and a second lens L2 (lens L[LS1m]) is contiguous with the image-side substrate surface of the first lens substrate LS1. Specifically, the first lens L1 and the second lens L2 are configured as noted below. The aperture stop ape is formed at the boundary surface between the first lens L1 and the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

The second lens block BK2 is located to the image side of the first lens block BK1, and includes a second lens substrate LS2. A third lens L3 (lens L[LS2o]) is contiguous with the object-side substrate surface of the second lens substrate LS2, and a fourth lens L4 (lens L[LS2m]) is contiguous with the image-side substrate surface of the second lens substrate LS2. Specifically, the third and fourth lenses L3 and L4 are configured as noted below.

The third lens L3 is a plano-concave lens concave to the object side (its object-side lens surface being an aspherical surface); and The fourth lens L4 is a plano-convex lens convex to the image side (its image-side lens surface being an aspherical surface).

The third lens block BK3 located to the image-side of the second lens block BK2 includes a third lens substrate LS3. A fifth lens L5 (lens L[LS3o]) is contiguous with the object-side substrate surface of the third lens substrate LS3, and a sixth lens L6 (lens L[LS3m]) is contiguous with the image-side substrate surface of the third lens substrate LS3. Specifically, the fifth lens L5 and the sixth lens L6 are configured as noted below.

The fifth lens L5 is a plano-convex lens convex to the object side (its object-side lens surface is aspherical, being convex at its vertex and concave in its part intersecting the principal ray with the maximum image height); and The sixth lens L6 is a plano-concave lens concave to the image side (its image-side lens surface being an aspherical surface).

● Example 2

In Example 2, the imaging lens LN includes a first lens block BK1, a second lens block BK2, and a third lens block BK3, and also includes an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The third lens L3 is a plano-concave lens concave to the object side (its object-side lens surface being an aspherical surface); and The fourth lens L4 is a plano-convex lens convex to the image side (its image-side lens surface being an aspherical surface).

In the third lens block BK1, a fifth lens L5 (lens L[LS3o]) contiguous with the object-side substrate surface of a third lens substrate LS3 and a sixth lens L6 (lens L[LS3m]) contiguous with the image-side substrate surface of the third lens substrate LS3 are configured as noted below.

The fifth lens L5 is a plano-concave lens concave to the object side (its object-side lens surface being an aspherical surface); and The sixth lens L6 is a plano-convex lens convex to the image side (its image-side lens surface being an aspherical surface).

● Example 3

In Example 3, the imaging lens LN includes a first lens block BK1, a second lens block BK2, and a third lens block BK3, and also includes an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The first lens L1 is a plano-convex lens convex to the object side (its object-side lens surface being an aspherical surface); and The second lens L2 is a plano-convex lens convex to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The third lens L3 is a plano-concave lens concave to the object side (its object-side lens surface being an aspherical surface); and The fourth lens L4 is a plano-convex lens convex to the image side (its image-side lens surface being an aspherical surface).

In the third lens block BK1, a fifth lens L5 (lens L[LS3o]) contiguous with the object-side substrate surface of a third lens substrate LS3 and a sixth lens L6 (lens L[LS3m]) contiguous with the image-side substrate surface of the third lens substrate LS3 are configured as noted below.

The fifth lens L5 is a plano-convex lens convex to the object side (its object-side lens surface is aspherical, being convex at its vertex and concave in its part intersecting the principal ray with the maximum image height); and The sixth lens L6 is a plano-concave lens concave to the image side (its image-side lens surface being an aspherical surface).

● Example 4 ● Example 5

In Examples 4 and 5, the imaging lens LN includes a first lens block BK1, a second lens block BK2, and a third lens block BK3, and also includes an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

The second lens block BK2 includes a second lens substrate LS2, and, only with the object-side substrate surface of the second lens substrate LS2, a lens L (a third lens L3 (lens L[LS2o])) contiguous. Specifically, the third lens L3 is configured as noted below.

The third lens L3 is a plano-concave lens concave to the object side (its object-side lens surface being an aspherical surface).

In the third lens block BK1, a fourth lens L4 (lens L[LS3o]) contiguous with the object-side substrate surface of a third lens substrate LS3 and a fifth lens L5 (lens L[LS3m]) contiguous with the image-side substrate surface of the third lens substrate LS3 are configured as noted below.

The fourth lens L4 is a plano-convex lens convex to the object side (its object-side lens surface being an aspherical surface); and The fifth lens L5 is a plano-concave lens concave to the image side (its image-side lens surface being an aspherical surface).

● Example 6

In Example 6, the imaging lens LN includes a first lens block BK1, a second lens block BK2, and a third lens block BK3, and also includes an aperture stop ape. What is particular about this imaging lens LN, as distinct from the imaging lenses LN of Examples 1 to 5, is that it includes a lens substrate LS in which lens substrate pieces LSP and LSP are contiguous with each other.

The first lens block BK1 disposed at the most object-side position includes a first lens substrate LS1. The first lens substrate LS1 is formed by joining together (such as by cementing together) a lens substrate piece LSP1$o$ located on the object side and a lens substrate piece LSP1$m$ located on the image side. Even with such a first lens substrate LS1, both its, object-side and image-side, substrate surfaces (the object-side substrate surface of the lens substrate piece LSP1$o$ and the image-side substrate surface of the lens substrate piece LSP1$m$) are planar. Thus, the first lens substrate LS1 is a plane-parallel plate.

A first lens L1 (lens L[LS1$o$]) is contiguous with the object-side substrate surface of the first lens substrate LS1, and a second lens L2 (lens L[LS1$m$]) is contiguous with the image-side substrate surface of the first lens substrate LS1. Specifically, the first lens L1 and the second lens L2 are configured as noted below. The aperture stop ape is formed at the boundary surface between the lens substrate pieces LSP1$o$ LSP1$m$ in the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

In the second lens block BK2, a third lens L3 (lens L[LS2$o$]) contiguous with the object-side substrate surface of a second lens substrate LS2 and a fourth lens L4 (lens L[LS2$m$]) contiguous with the image-side substrate surface of the second lens substrate LS2 are configured as noted below.

The third lens L3 is a plano-concave lens concave to the object side (its object-side lens surface being an aspherical surface).

The fourth lens L4 is a plano-convex lens convex to the image side (its image-side lens surface being an aspherical surface).

In the third lens block BK1, a fifth lens L5 (lens L[LS3$o$]) contiguous with the object-side substrate surface of a third lens substrate LS3 and a sixth lens L6 (lens L[LS3$m$]) contiguous with the image-side substrate surface of the third lens substrate LS3 are configured as noted below.

The fifth lens L5 is a plano-concave lens concave to the object side (its object-side lens surface being an aspherical surface); and The sixth lens L6 is a plano-convex lens convex to the image side (its image-side lens surface being an aspherical surface).

●Example 7

In Example 7, the imaging lens LN includes a first lens substrate LS1 formed of lens substrate pieces LSP1$o$ and LSP1$m$ that are contiguous with each other. Furthermore, the imaging lens LN includes a first lens block BK1, a second lens block BK2, and a third lens block BK3, and also includes an aperture stop ape.

In the first lens block BK1, a first lens L1 (lens L[LS1$o$]) contiguous with the object-side substrate surface of the first lens substrate LS1 and a second lens L2 (lens L[LS1$m$]) contiguous with the image-side substrate surface of the first lens substrate LS1 are configured as noted below. The aperture stop ape is formed at the boundary surface between the lens substrate pieces LSP10 and LSP1$m$ in the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

In the second lens block BK2, a third lens L3 (lens L[LS2$o$]) contiguous with the object-side substrate surface of a second lens substrate LS2 and a fourth lens L4 (lens L[LS2$m$]) contiguous with the image-side substrate surface of the second lens substrate LS2 are configured as noted below.

The third lens L3 is a plano-concave lens concave to the object side (its object-side lens surface being an aspherical surface).

The fourth lens L4 is a plano-convex lens convex to the image side (its image-side lens surface being an aspherical surface).

The third lens block BK3 includes a third lens substrate LS3, and, only with the object-side substrate surface of the third lens substrate LS3, a lens L (a fifth lens L5 (lens L[LS3$o$])) is contiguous. Specifically, the fifth lens L5 is configured as noted below.

The fifth lens L5 is a plano-concave lens concave to the object side (its object-side lens surface being an aspherical surface).

●Example 8

In Example 8, the imaging lens LN includes, in addition to a first lens block BK1 to a third lens blocks BK3, a fourth lens block BK4. The fourth lens block BK4 is located to the image-side of the third lens block BK3. Also, the imaging lens LN includes an aperture stop ape.

In the first lens block BK1, a first lens L1 (lens L[LS1$o$]) contiguous with the object-side substrate surface of a first lens substrate LS1 and a second lens L2 (lens L[LS1$m$]) contiguous with the image-side substrate surface of the first lens substrate LS1 are configured as noted below. The aperture stop ape is formed at the boundary surface between the first lens L1 and the first lens substrate LS1.

The first lens L1 is a plano-convex lens convex to the object side (its object-side lens surface being an aspherical surface); and The second lens L2 is a plano-concave lens concave to the image side (its image-side lens surface being an aspherical surface).

In the second lens block BK2, a third lens L3 (lens L[LS2$o$]) contiguous with the object-side substrate surface of a second lens substrate LS2 and a fourth lens L4 (lens L[LS2$m$]) contiguous with the image-side substrate surface of the second lens substrate LS2 are configured as noted below.

The third lens L3 is a plano-concave lens concave to the object side (its object-side lens surface being an aspherical surface); and The fourth lens L4 is a plano-convex lens convex to the object side (its object-side lens surface is aspherical, being convex at its vertex and concave in its part intersecting the principal ray with the maximum image height).

The third lens block BK3 includes a third lens substrate LS3 and has only one lens L {a fifth lens L5(lens L[LS3$m$])} contiguous with the image-side substrate surface of the third lens substrate LS3. Specifically, the fifth lens L5 is configured as noted below.

The fifth lens L5 is a plano-convex lens convex to the image side (its image-side lens surface being an aspherical surface).

The fourth lens block BK4 includes a fourth lens substrate LS4. A sixth lens L6 (lens L[LS4o]) is contiguous with the object-side substrate surface of the fourth lens substrate LS4, and a seventh lens L7 (lens L[LS4m]) is contiguous with the image-side substrate surface of the fourth lens substrate LS4. Specifically, the sixth lens L6 and the seventh lens L7 are configured as noted below.

The sixth lens L6 is a plano-concave lens concave to the object side (its object-side lens surface is aspherical, being concave at its vertex and convex in its part intersecting the principal ray with the maximum image height); and The seventh lens L7 is a plano-concave lens (its image-side lens surface being aspherical) (the image-side lens surface of this seventh lens L7 is aspherical, being concave at its vertex and convex in its part intersecting the principal ray with the maximum image height).

[■ Lens Data of the Imaging Lens]

Next, with respect to the imaging lenses LN of Examples (EX) 1 to 8, their respective general data, construction data, and aspherical surface data will be presented in tables.

The symbols used to present the general data are as follows:

f represents the focal length (in the unit of mm);
Fno represents the f-number;
BF represents the back-focal length (given as an equivalent length in air, which applies also to the back-focal length included in the optical total length, i.e., the total length of the imaging lens LN);
Y' represents the image height (in the unit of mm; with distortion disregarded);
ω represents the half angle of view (in the unit of degrees; with distortion taken into consideration); and
TL represents the total length of the imaging lens LN (in the unit of mm).

With respect to a lens L contiguous with the object-side substrate surface of a lens substrate LS, its focal length is calculated on the assumption that air is present on the object side of the lens L and that the medium of the lens substrate LS is present on the image side of the lens L. With respect to a lens L contiguous with the image-side substrate surface of a lens substrate LS, its focal length is calculated on the assumption that the medium of the lens substrate LS is present on the object side of the lens L and that air is present on the image side of the lens L.

With respect to the object-side lens surface of an uncemented lens L, its focal length is calculated on the assumption that air is present on the object side of the lens L and that the medium of the lens substrate LS is present on the image side of the lens L. Needless to say, with respect to the image-side lens surface of an uncemented lens L, its focal length is calculated on the assumption that the medium of the lens substrate LS is present on the object side of the lens L and that air is present on the image side of the lens L.

The symbols used to present the construction data are as follows:

si represents a lens surface or substrate surface, with the suffixed number representing its place in order as counted from the object side to the image side;
i is a number suffixed as in "si" to represent the place in order as counted from the object side to the image side;
* indicates an aspherical surface;
ape represents an aperture stop;
r represents a radius of curvature (in the unit of mm) of a lens surface or substrate surface;
d represents an axial distance (in the unit of mm);
Nd represents the index of refraction of a medium for d-line (with a wavelength of 587.56 nm); and
νd represents the Abbe number of a medium for d-line.

Aspherical surface data is defined by formula (AS) below employing the local rectangular coordinate system (x, y, z) having its origin at the vertex of an aspherical surface. Presented for each relevant surface (si) are the values of K and A to I below (wherever A to I are zero, they are omitted); for all these values, "E–n" stands for "×10$^{-n}$".

$$z = (c \cdot \rho^2)/[1+\sqrt{1-(1+K) \cdot c^2 \cdot \rho^2}] + A \cdot \rho^4 + B \cdot \rho^6 + C \cdot \rho^8 + D \cdot \rho^{10} + E \cdot \rho^{12} + F \cdot \rho^{14} + G \cdot \rho^{16} + H \cdot \rho^{18} + I \cdot \rho^{20} \quad \text{(AS)}$$

where
ρ represents the height in a direction perpendicular to the z-axis (the optical axis AX) ($\rho^2 = x^2 + y^2$);
z represents the amount of sag in the optical axis AX direction at the height ρ (relative to the vertex);
c represents the curvature (the reciprocal of the radius of curvature r) at the vertex;
K represents the conic constant; and
A to I represent the aspherical surface coefficients of orders 4, 6, 8, 10, 12, 14, 16, 18, and 20 respectively.

Example 1

TABLE 1

| EXAMPLE 1 | | | | | | | | |
|---|---|---|---|---|---|---|---|---|
| f[mm] | | 2.954 | | Fno | | 2.8 | BF[min] | 0.5282 |
| Y'[mm] | | 1.750 | | ω[°] | | 30.64 | TL[min] | 3.280 |
| si | | i | r[mm] | i | d[mm] | i | Nd | νd | Element |

| si | | i | r[mm] | i | d[mm] | i | Nd | νd | Element | |
|---|---|---|---|---|---|---|---|---|---|---|
| s1 | * | 1 | 0.758 | | | | | | L1 | BK1 |
| | | | | 1 | 0.360 | 1 | 1.5071 | 54.00 | | |
| s2 | ape | 2 | ∞ | | | | | | | |
| | | | | 2 | 0.303 | 2 | 1.8408 | 40.83 | LS1 | |
| s3 | | 3 | ∞ | | | | | | | |
| | | | | 3 | 0.114 | 3 | 1.6100 | 26.00 | L2 | |
| s4 | * | 4 | 2.606 | | | | | | | |
| | | | | 4 | 0.281 | | | | | |
| s5 | * | 5 | −1.751 | | | | | | L3 | BK2 |
| | | | | 5 | 0.095 | 4 | 1.6100 | 26.00 | | |

TABLE 1-continued

EXAMPLE 1

| si | | i | r[mm] | i | d[mm] | i | Nd | vd | Element | |
|---|---|---|---|---|---|---|---|---|---|---|
| s6 | | 6 | ∞ | | | | | | | |
| | | | | 6 | 0.360 | 5 | 1.8408 | 40.83 | LS2 | |
| s7 | | 7 | ∞ | | | | | | | |
| | | | | 7 | 0.198 | 6 | 1.6100 | 26.00 | L4 | |
| s8 | * | 8 | −33.387 | | | | | | | |
| | | | | 8 | 0.110 | | | | | |
| s9 | * | 9 | 7.682 | | | | | | L5 | BK3 |
| | | | | 9 | 0.110 | 7 | 1.5305 | 55.72 | | |
| s10 | | 10 | ∞ | | | | | | | |
| | | | | 10 | 0.312 | 8 | 1.8408 | 40.83 | LS3 | |
| s11 | | 11 | ∞ | | | | | | | |
| | | | | 11 | 0.510 | 9 | 1.5305 | 55.72 | L6 | |
| s12 | * | 12 | 5.749 | | | | | | | |
| | | | | 12 | 0.528 | | | | | |
| s13 | | 13 | ∞ | | | | | | SR | |

TABLE 2

EXAMPLE 1
Aspherical Surface Data

| si | s1 | s4 | s5 | s8 | s9 | s12 |
|---|---|---|---|---|---|---|
| K | 1.52E−02 | 2.72E+01 | 1.11E+01 | 0.00E+00 | −5.44E+02 | −1.31E+02 |
| A | −8.73E−03 | 3.43E−02 | −1.82E−01 | −7.36E−02 | −1.09E−01 | −1.39E−01 |
| B | 1.07E−01 | −4.99E−01 | −1.14E+00 | −2.57E−02 | −2.61E−03 | 2.93E−02 |
| C | −1.83E−01 | 1.14E+00 | 2.31E+00 | −1.62E−02 | −8.62E−03 | −2.37E−02 |
| D | 6.94E−01 | −9.83E−01 | −1.22E+01 | −2.96E−02 | −1.58E−02 | −1.76E−02 |
| E | −2.14E+00 | −1.15E+01 | 3.69E+00 | 0.00E+00 | −1.89E−02 | 8.83E−03 |
| F | 8.57E+00 | −1.45E+01 | 2.58E+01 | 0.00E+00 | −1.65E−02 | 5.73E−03 |
| G | 0.00E+00 | −2.16E+02 | −3.77E+00 | 0.00E+00 | −1.02E−02 | −3.87E−03 |
| H | 0.00E+00 | 8.29E+02 | −1.62E+03 | 0.00E+00 | 6.72E−04 | 5.37E−05 |
| I | 0.00E+00 | 0.00E+00 | −2.05E+03 | 0.00E+00 | 1.60E−02 | 1.47E−04 |

Example 2

TABLE 3

EXAMPLE 2

| f[mm] | | | 2.874 | | Fno | | 2.8 | | BF[mm] | | 0.3700 | |
| Y'[mm] | | | 1.750 | | ω[°] | | 31.82 | | TL[mm] | | 3.180 | |

| si | | i | r[mm] | i | d[mm] | i | Nd | vd | Element | |
|---|---|---|---|---|---|---|---|---|---|---|
| s1 | * | 1 | 0.907 | | | | | | L1 | BK1 |
| | | | | 1 | 0.202 | 1 | 1.5071 | 54.00 | | |
| s2 | ape | 2 | ∞ | | | | | | | |
| | | | | 2 | 0.455 | 2 | 1.4874 | 70.44 | LS1 | |
| s3 | | 3 | ∞ | | | | | | | |
| | | | | 3 | 0.080 | 3 | 1.5071 | 54.00 | L2 | |
| s4 | * | 4 | 2.328 | | | | | | | |
| | | | | 4 | 0.250 | | | | | |
| s5 | * | 5 | −1.384 | | | | | | L3 | BK2 |
| | | | | 5 | 0.053 | 3 | 1.5071 | 54.00 | | |
| s6 | | 6 | ∞ | | | | | | | |
| | | | | 6 | 0.300 | 4 | 1.4874 | 70.44 | LS2 | |
| s7 | | 7 | ∞ | | | | | | | |
| | | | | 7 | 0.250 | 5 | 1.5071 | 54.00 | L4 | |
| s8 | * | 8 | −0.905 | | | | | | | |
| | | | | 8 | 0.594 | | | | | |
| s9 | * | 9 | −0.902 | | | | | | L5 | BK3 |
| | | | | 9 | 0.080 | 6 | 1.5071 | 54.00 | | |
| s10 | | 10 | ∞ | | | | | | | |
| | | | | 10 | 0.300 | 7 | 1.4874 | 70.44 | LS3 | |
| s11 | | 11 | ∞ | | | | | | | |
| | | | | 11 | 0.250 | 8 | 1.5071 | 54.00 | L6 | |
| s12 | * | 12 | −5.158 | | | | | | | |
| | | | | 12 | 0.355 | | | | | |
| s13 | | 13 | ∞ | | | | | | SR | |

TABLE 4

EXAMPLE 2
Aspherical Surface Data

| si | s1 | s4 | s5 | s8 | s9 | s12 |
|---|---|---|---|---|---|---|
| K | 2.88E−01 | 2.82E+00 | 4.87E+00 | −5.63E−03 | −1.40E+00 | −5.44E+00 |
| A | −4.53E−02 | 1.22E−01 | −5.36E−02 | 2.24E−01 | 2.14E−01 | −1.15E−02 |
| B | 2.12E−02 | 1.14E−01 | 2.60E−01 | 1.77E−01 | 1.81E−03 | −1.07E−02 |
| C | −1.43E−01 | 3.05E−01 | 1.53E+00 | 5.46E−01 | −1.27E−02 | 4.78E−03 |

Example 3

TABLE 5

EXAMPLE 3

| f[mm] | 2.999 | Fno | 2.9 | BF[mm] | 1.0255 |
|---|---|---|---|---|---|
| Y'[mm] | 1.750 | ω[°] | 30.30 | TL[mm] | 3.600 |

| si | | i | r[mm] | i | d[mm] | i | Nd | νd | Element | |
|---|---|---|---|---|---|---|---|---|---|---|
| s1 | * | 1 | 1.517 | | | | | | L1 | BK1 |
| | | | | 1 | 0.165 | 1 | 1.5150 | 58.10 | | |
| s2 | ape | 2 | ∞ | | | | | | | |
| | | | | 2 | 0.300 | 2 | 1.5160 | 64.10 | LS1 | |
| s3 | | 3 | ∞ | | | | | | | |
| | | | | 3 | 0.089 | 3 | 1.5150 | 58.10 | L2 | |
| s4 | * | 4 | −7.691 | | | | | | | |
| | | | | 4 | 0.411 | | | | | |
| s5 | * | 5 | −1.239 | | | | | | L3 | BK2 |
| | | | | 5 | 0.050 | 4 | 1.5410 | 33.10 | | |
| s6 | | 6 | ∞ | | | | | | | |
| | | | | 6 | 0.300 | 5 | 1.5160 | 64.10 | LS2 | |
| s7 | | 7 | ∞ | | | | | | | |
| | | | | 7 | 0.200 | 6 | 1.5150 | 58.10 | L4 | |
| s8 | * | 8 | −1.405 | | | | | | | |
| | | | | 8 | 0.375 | | | | | |
| s9 | * | 9 | 2.059 | | | | | | L5 | BK3 |
| | | | | 9 | 0.131 | 7 | 1.5150 | 58.10 | | |
| s10 | | 10 | ∞ | | | | | | | |
| | | | | 10 | 0.500 | 8 | 1.5160 | 64.10 | LS3 | |
| s11 | | 11 | ∞ | | | | | | | |
| | | | | 11 | 0.050 | 9 | 1.5150 | 58.10 | L6 | |
| s12 | * | 12 | 1.244 | | | | | | | |
| | | | | 12 | 1.025 | | | | | |
| s13 | | 13 | ∞ | | | | | | SR | |

TABLE 6

EXAMPLE 3
Aspherical Surface Data

| si | s1 | s4 | s5 | s8 | s9 | s12 |
|---|---|---|---|---|---|---|
| K | 2.82E+00 | 3.00E+01 | −6.19E+00 | 2.99E−01 | −1.96E+01 | −6.46E+00 |
| A | −1.65E−01 | −6.98E−02 | −3.26E−01 | −5.61E−02 | −2.69E−01 | −1.50E−01 |
| B | −3.50E−02 | −6.73E−03 | 6.84E−02 | 4.73E−01 | 1.31E−01 | 7.59E−02 |
| C | −4.00E−01 | −1.18E−02 | 4.06E−01 | 6.18E−04 | −1.04E−02 | −4.43E−02 |
| D | −1.09E−01 | 2.68E−01 | −1.08E+00 | 2.22E−02 | −6.08E−02 | 1.30E−02 |
| E | 0.00E+00 | 0.00E+00 | 6.22E−01 | 8.31E−02 | 3.70E−02 | −1.57E−03 |

Example 4

TABLE 7

EXAMPLE 4

| f[mm] | 2.927 | Fno | 2.8 | BF[mm] | 0.6582 |
|---|---|---|---|---|---|
| Y'[mm] | 1.750 | ω[°] | 30.88 | TL[mm] | 3.176 |

| si | | i | r[mm] | i | d[mm] | i | Nd | νd | Element | |
|---|---|---|---|---|---|---|---|---|---|---|
| s1 | * | 1 | 0.798 | | | | | | L1 | BK1 |
| | | | | 1 | 0.339 | 1 | 1.5071 | 54.00 | | |

TABLE 7-continued

| | | | | | EXAMPLE 4 | | | | | |
|---|---|---|---|---|---|---|---|---|---|---|
| s2 | ape | 2 | ∞ | | | | | | | |
| | | | | 2 | 0.308 | 2 | 1.5508 | 43.35 | LS1 | |
| s3 | | 3 | ∞ | | | | | | | |
| | | | | 3 | 0.109 | 3 | 1.5737 | 29.00 | L2 | |
| s4 | * | 4 | 2.618 | | | | | | | |
| | | | | 4 | 0.207 | | | | | |
| s5 | * | 5 | −1.816 | | | | | | L3 | BK2 |
| | | | | 5 | 0.099 | 4 | 1.5737 | 29.00 | | |
| s6 | | 6 | ∞ | | | | | | | |
| | | | | 6 | 0.375 | 5 | 1.5508 | 43.35 | LS2 | |
| s7 | | 7 | ∞ | | | | | | | |
| | | | | 7 | 0.100 | | | | | |
| s8 | * | 8 | 3.325 | | | | | | L4 | BK3 |
| | | | | 8 | 0.104 | 6 | 1.5071 | 54.00 | | |
| s9 | | 9 | ∞ | | | | | | | |
| | | | | 9 | 0.304 | 7 | 1.5531 | 43.28 | LS3 | |
| s10 | | 10 | ∞ | | | | | | | |
| | | | | 10 | 0.572 | 8 | 1.5071 | 54.00 | L5 | |
| s11 | * | 11 | 3.856 | | | | | | | |
| | | | | 11 | 0.658 | | | | | |
| s12 | | 12 | ∞ | | | | | | SR | |

TABLE 8

EXAMPLE 4
Aspherical Surface Data

| si | s1 | s4 | s5 | s8 | s11 |
|---|---|---|---|---|---|
| K | 1.95E−02 | 2.43E+01 | 1.09E+01 | −1.36E+02 | −1.06E+02 |
| A | −7.50E−04 | 1.22E−01 | 2.12E−01 | −1.18E−01 | −1.22E−01 |
| B | 1.22E−01 | −4.91E−01 | −1.32E+00 | −4.71E−02 | 1.34E−02 |
| C | −1.64E−01 | 1.15E+00 | 1.69E+00 | 1.00E−03 | −1.88E−02 |
| D | 8.90E−01 | 2.30E−02 | −3.12E+00 | −3.52E−02 | −1.51E−02 |
| E | −2.19E+00 | −8.87E+00 | 2.70E+00 | −6.31E−03 | 7.97E−03 |
| F | 4.90E+00 | −3.57E+00 | 2.82E+01 | −2.61E−02 | 4.14E−03 |
| G | 0.00E+00 | −1.85E+02 | 4.19E+01 | 1.40E−02 | −3.86E−03 |
| H | 0.00E+00 | 8.43E+02 | −1.28E+03 | 3.75E−02 | 2.95E−04 |
| I | 0.00E+00 | 0.00E+00 | 5.02E+00 | 2.89E−02 | 7.25E−05 |

Example 5

TABLE 9

| | | | EXAMPLE 5 | | | | |
|---|---|---|---|---|---|---|---|
| f[mm] | | 2.824 | Fno | | 2.9 | BF[mm] | 0.6665 |
| Y'[mm] | | 1.750 | ω[°] | | 31.80 | TL[mm] | 2.890 |

| si | i | r[mm] | i | d[mm] | i | Nd | vd | Element | |
|---|---|---|---|---|---|---|---|---|---|
| s1 | * | 1 | 0.677 | | | | | L1 | BK1 |
| | | | | 1 | 0.249 | 1 | 1.5150 | 58.10 | |
| s2 | ape | 2 | ∞ | | | | | | |
| | | | | 2 | 0.300 | 2 | 1.4740 | 56.40 | LS1 |
| s3 | | 3 | ∞ | | | | | | |
| | | | | 3 | 0.050 | 3 | 1.5150 | 58.10 | L2 |
| s4 | * | 4 | 1.381 | | | | | | |
| | | | | 4 | 0.309 | | | | |
| s5 | * | 5 | −5.432 | | | | | L3 | BK2 |
| | | | | 5 | 0.058 | 4 | 1.5150 | 58.10 | |
| s6 | | 6 | ∞ | | | | | | |
| | | | | 6 | 0.300 | 5 | 1.4740 | 56.40 | LS2 |
| s7 | | 7 | ∞ | | | | | | |
| | | | | 7 | 0.309 | | | | |
| s8 | * | 8 | 2.325 | | | | | L4 | BK3 |
| | | | | 8 | 0.163 | 6 | 1.5150 | 58.10 | |
| s9 | | 9 | ∞ | | | | | | |
| | | | | 9 | 0.300 | 7 | 1.4740 | 56.40 | LS3 |

TABLE 9-continued

| | | EXAMPLE 5 | | | | | | |
|---|---|---|---|---|---|---|---|---|
| s10 | | 10 | ∞ | | | | | |
| | | | | 10 | 0.187 | 8 | 1.5410 | 33.10 | L5 |
| s11 | * | 11 | 1.634 | | | | | |
| | | | | 11 | 0.667 | | | |
| s12 | | 12 | ∞ | | | | | SR |

TABLE 10

EXAMPLE 5
Aspherical Surface Data

| si | s1 | s4 | s5 | s8 | s11 |
|---|---|---|---|---|---|
| K | −3.64E−03 | 2.79E+00 | 1.67E+01 | −5.87E+01 | −1.32E+01 |
| A | 9.17E−03 | 3.99E−01 | 1.80E−01 | −2.72E−01 | −1.75E−01 |
| B | 3.98E−01 | 9.94E−02 | −1.45E+00 | 2.13E−01 | 3.55E−02 |
| C | −1.39E+00 | 3.12E+00 | −1.25E+00 | 2.47E−02 | −1.27E−02 |
| D | 3.24E+00 | 1.47E+01 | 1.63E+01 | −6.89E−02 | 6.44E−03 |
| E | 0.00E+00 | 0.00E+00 | −1.90E+01 | 1.84E−02 | −1.44E−04 |

Example 6

TABLE 11

| | | | EXAMPLE 6 | | | | | |
|---|---|---|---|---|---|---|---|---|
| f[mm] | | 2.897 | | Fno | 2.8 | | BF[mm] | 0.3700 |
| Y'[mm] | | 1.750 | | ω[°] | 31.81 | | TL[mm] | 3.180 |

| si | | i | r[mm] | i | d[mm] | i | Nd | νd | Element | |
|---|---|---|---|---|---|---|---|---|---|---|
| s1 | * | 1 | 0.907 | | | | | | L1 | BK1 |
| | | | | 1 | 0.202 | 1 | 1.5071 | 54.00 | | |
| s2 | | 2 | ∞ | | | | | | | |
| | | | | 2 | 0.135 | 2 | 1.4874 | 70.44 | LSP1o | LS1 |
| s3 | ape | 3 | ∞ | | | | | | | |
| | | | | 3 | 0.320 | 3 | 1.4874 | 70.44 | LSP1m | |
| s4 | | 4 | ∞ | | | | | | | |
| | | | | 4 | 0.080 | 4 | 1.5071 | 54.00 | L2 | |
| s5 | * | 5 | 2.328 | | | | | | | |
| | | | | 5 | 0.250 | | | | | |
| s6 | * | 6 | −1.384 | | | | | | L3 | BK2 |
| | | | | 6 | 0.053 | 5 | 1.5071 | 54.00 | | |
| s7 | | 7 | ∞ | | | | | | | |
| | | | | 7 | 0.300 | 6 | 1.4874 | 70.44 | LS2 | |
| s8 | | 8 | ∞ | | | | | | | |
| | | | | 8 | 0.250 | 7 | 1.5071 | 54.00 | L4 | |
| s9 | * | 9 | −0.905 | | | | | | | |
| | | | | 9 | 0.594 | | | | | |
| s10 | * | 10 | −0.902 | | | | | | L5 | BK3 |
| | | | | 10 | 0.080 | 8 | 1.5071 | 54.00 | | |
| s11 | | 11 | ∞ | | | | | | | |
| | | | | 11 | 0.300 | 9 | 1.4874 | 70.44 | LS3 | |
| s12 | | 12 | ∞ | | | | | | | |
| | | | | 12 | 0.250 | 10 | 1.5071 | 54.00 | L6 | |
| s13 | * | 13 | −5.158 | | | | | | | |
| | | | | 13 | 0.355 | | | | | |
| s14 | | 14 | ∞ | | | | | | SR | |

TABLE 12

EXAMPLE 6
Aspherical Surface Data

| si | s1 | s5 | s6 | s9 | s10 | s13 |
|---|---|---|---|---|---|---|
| K | 2.88E−01 | 2.82E+00 | 4.87E+00 | −5.63E−03 | −1.40E+00 | −5.44E+00 |
| A | −4.53E−02 | 1.22E−01 | −5.36E−02 | 2.24E−01 | 2.14E−01 | −1.15E−02 |
| B | 2.12E−02 | 1.14E−01 | 2.60E−01 | 1.77E−01 | 1.81E−03 | −1.07E−02 |
| C | −1.43E−01 | 3.05E−01 | 1.53E+00 | 5.46E−01 | −1.27E−02 | 4.78E−03 |

Example 7

TABLE 13

| \multicolumn{9}{c}{EXAMPLE 7} |
|---|

| f[mm] | 2.720 | | Fno | | 2.8 | BF[mm] | | 0.3582 |
|---|---|---|---|---|---|---|---|---|
| Y'[mm] | 1.750 | | ω[°] | | 32.80 | TL[mm] | | 3.010 |

| si | | i | r[mm] | i | d[mm] | i | Nd | vd | Element | |
|---|---|---|---|---|---|---|---|---|---|---|
| s1 | * | 1 | 0.791 | | | | | | L1 | BK1 |
| | | | | 1 | 0.250 | 1 | 1.5150 | 58.10 | | |
| s2 | | 2 | ∞ | | | | | | | |
| | | | | 2 | 0.070 | 2 | 1.7730 | 49.60 | LSP1o | LS1 |
| s3 | ape | 3 | ∞ | | | | | | | |
| | | | | 3 | 0.300 | 3 | 1.4870 | 70.20 | LSP1m | |
| s4 | | 4 | ∞ | | | | | | | |
| | | | | 4 | 0.050 | 4 | 1.4740 | 47.00 | L2 | |
| s5 | * | 5 | 1.626 | | | | | | | |
| | | | | 5 | 0.396 | | | | | |
| s6 | * | 6 | −3.568 | | | | | | L3 | BK2 |
| | | | | 6 | 0.100 | 5 | 1.6360 | 23.00 | | |
| s7 | | 7 | ∞ | | | | | | | |
| | | | | 7 | 0.450 | 6 | 1.6060 | 37.00 | LS2 | |
| s8 | | 8 | ∞ | | | | | | | |
| | | | | 8 | 0.250 | 7 | 1.6360 | 23.00 | L4 | |
| s9 | * | 9 | −3.250 | | | | | | | |
| | | | | 9 | 0.278 | | | | | |
| s10 | * | 10 | −3.229 | | | | | | L5 | BK3 |
| | | | | 10 | 0.205 | 8 | 1.6360 | 23.00 | | |
| s11 | | 11 | ∞ | | | | | | | |
| | | | | 11 | 0.300 | 9 | 1.4870 | 70.20 | LS3 | |
| s12 | | 12 | ∞ | | | | | | | |
| | | | | 12 | 0.358 | | | | | |
| s13 | | 13 | ∞ | | | | | | SR | |

TABLE 14

| \multicolumn{6}{c}{EXAMPLE 7 Aspherical Surface Data} |
|---|

| si | s1 | s5 | s6 | s9 | s10 |
|---|---|---|---|---|---|
| K | 2.59E−01 | 8.19E+00 | 3.23E+01 | −1.40E+02 | −2.25E+02 |
| A | −8.47E−02 | 9.20E−02 | −1.58E−01 | 1.06E−01 | 1.65E−01 |
| B | 9.86E−02 | −4.07E−01 | −5.09E−01 | −2.17E−01 | −8.46E−02 |
| C | −6.70E−01 | 2.58E+00 | −1.01E+00 | 4.84E−02 | 1.38E−02 |

Example 8

TABLE 15

| \multicolumn{9}{c}{EXAMPLE 8} |
|---|

| f[mm] | 2.750 | | Fno | | 2.8 | BF[mm] | | 0.1081 |
|---|---|---|---|---|---|---|---|---|
| Y'[mm] | 1.750 | | ω[°] | | 32.32 | TL[mm] | | 3.198 |

| si | | i | r[mm] | i | d[mm] | i | Nd | vd | Element | |
|---|---|---|---|---|---|---|---|---|---|---|
| s1 | * | 1 | 0.923 | | | | | | L1 | BK1 |
| | | | | 1 | 0.330 | 1 | 1.5070 | 54.00 | | |
| s2 | ape | 2 | ∞ | | | | | | | |
| | | | | 2 | 0.300 | 2 | 1.5300 | 48.91 | LS1 | |
| s3 | | 3 | ∞ | | | | | | | |
| | | | | 3 | 0.080 | 3 | 1.5740 | 29.00 | L2 | |
| s4 | * | 4 | 5.000 | | | | | | | |
| | | | | 4 | 0.336 | | | | | |
| s5 | * | 5 | −3.144 | | | | | | L3 | BK2 |
| | | | | 5 | 0.075 | 4 | 1.5740 | 29.00 | | |
| s6 | | 6 | ∞ | | | | | | | |
| | | | | 6 | 0.359 | 5 | 1.5300 | 48.91 | LS2 | |

TABLE 15-continued

| EXAMPLE 8 | | | | | | | | | |
|---|---|---|---|---|---|---|---|---|---|
| s7 | 7 | ∞ | | | | | | | |
| | | | 7 | 0.100 | 6 | 1.5740 | 29.00 | L4 | |
| s8 * | 8 | −4.805 | | | | | | | |
| | | | 8 | 0.050 | | | | | |
| s9 | 9 | ∞ | | | | | | LS3 | BK3 |
| | | | 9 | 0.678 | 7 | 1.5300 | 48.91 | | |
| s10 | 10 | ∞ | | | | | | | |
| | | | 10 | 0.132 | 8 | 1.5740 | 29.00 | L5 | |
| s11 * | 11 | −277.220 | | | | | | | |
| | | | 11 | 0.200 | | | | | |
| s12 * | 12 | −1.681 | | | | | | L6 | BK4 |
| | | | 12 | 0.050 | 9 | 1.5740 | 29.00 | | |
| s13 | 13 | ∞ | | | | | | | |
| | | | 13 | 0.300 | 10 | 1.5300 | 48.91 | LS4 | |
| s14 | 14 | ∞ | | | | | | | |
| | | | 14 | 0.100 | 11 | 1.5740 | 29.00 | L7 | |
| s15 * | 15 | 15.376 | | | | | | | |
| | | | 15 | 0.108 | | | | | |
| s16 | 16 | ∞ | | | | | | SR | |

TABLE 16

EXAMPLE 8
Aspherical Surface Data

| si | s1 | s4 | s5 | s8 | s11 | s12 | s15 |
|---|---|---|---|---|---|---|---|
| K | 2.77E−01 | 2.04E+01 | −9.39E+01 | 2.08E+01 | −1.00E+03 | −1.03E+01 | −1.00E+03 |
| A | −3.94E−02 | 2.87E−02 | −5.69E−01 | 1.62E−01 | 1.29E−01 | 8.52E−02 | 2.22E−01 |
| B | −2.96E−01 | −4.79E−01 | 9.32E−01 | 5.78E−02 | −1.38E−01 | −1.79E−02 | −3.20E−01 |
| C | 1.48E+00 | 3.30E+00 | −5.77E+00 | −6.96E−02 | 4.81E−02 | 7.43E−04 | 1.52E−01 |
| D | −3.81E+00 | −1.41E+01 | 5.95E+00 | −3.63E−02 | 7.38E−03 | −3.75E−05 | −1.80E−02 |
| E | −4.17E+00 | 3.20E+00 | 1.13E+01 | 2.85E−02 | −8.22E−03 | 3.18E−04 | −5.09E−03 |
| F | 2.60E+01 | 5.49E+01 | −5.99E+01 | 1.61E−02 | −1.40E−03 | −5.95E−05 | 4.89E−04 |
| G | −2.50E+01 | 1.37E+01 | −2.95E+01 | −7.64E−03 | 1.20E−03 | 0.00E+00 | 2.65E−04 |
| H | 9.60E+00 | −3.02E+01 | −7.94E+01 | −1.87E−02 | 2.21E−04 | 0.00E+00 | 3.59E−05 |
| I | 2.94E+00 | −3.27E+02 | −2.39E+02 | 5.60E−02 | −1.17E−04 | 0.00E+00 | −1.86E−05 |

[■ Aberrations in an Imaging Lens]

Next, the aberrations in the imaging lens LN in different practical examples, namely Examples (EX) 1 to 8, are shown in FIGS. 9A to 16C. These aberration diagrams show spherical aberration (longitudinal spherical aberration), astigmatism (astigmatic field curves), and distortion.

The spherical aberration diagrams show the amount of spherical aberration for d-line (with a wavelength of 587.56 nm), the amount of spherical aberration for C-line (with a wavelength of 656.28 nm), and the amount of spherical aberration for g-line (with a wavelength of 435.84 nm), as expressed in terms of deviations from the paraxial image surface along the optical axis AX (in the unit of mm) In the spherical aberration diagrams, the horizontal axis represents the value of the height of incidence on the pupil as normalized with respect to its maximum height (i.e. the relative pupil height). What types of line are used to represent d-, c-, and g-lines is indicated in each diagram.

The astigmatism diagrams show the tangential image surface for d-line and the sagittal image surface for d-line, as expressed in terms of deviations from the paraxial image surface along the optical axis AX (in the unit of mm). The line marked "T" corresponds to the tangential image surface, and the line marked "S" corresponds to the sagittal image surface. In the astigmatism diagrams, the vertical axis represents the image height (IMG HT) (in the unit of mm).

In the distortion diagrams, the horizontal axis represents the distortion (in the unit of %) for d-line, and the vertical axis represents the image height (in the unit of mm). The image height corresponds to the maximum image height Y' (half the diagonal length of the sensing surface SS of the image sensor SR) on the imaging surface.

[■ Details of an Imaging Lens]

The construction of the imaging lens LN will now be described in more detail below.

The imaging lens LN includes a lens block (wafer scale lens) BK. The lens block BK is, as described previously, mass-produced inexpensively. To allow a wider choice of materials in its production, for example to allow the choice of easy-to-process or inexpensive materials (to manufacture the imaging lens LN easily and inexpensively), the lens block BK includes a lens L and a lens substrate LS made of different materials.

Furthermore, in consideration of a balance among various benefits such as compactness, high performance (for example, high aberration correction performance), and low cost, the imaging lens LN includes three or four lens blocks BK.

Moreover, as shown in FIGS. 18B and 18C, the imaging lens LN is manufactured by joining together lens block units UT, which each have a number of molded lenses L arranged on a lens substrate LS, and also a substrate B2, which can serve as a sensor cover, with spacer members B1 in between, and then cutting them apart along the spacer members B1.

Thus, when the lens substrates LS are plane-parallel plates, in the manufacturing process of the imaging lens LN, not only is the processing of the lens substrates LS easy or unnecessary, but also the lenses L, formed on the substrate surfaces, are stable. Thus, a lens substrate LS in the form of a plane-parallel plate helps alleviate the burden involved in the manufacture of the imaging lens LN.

Furthermore, when the lens substrates LS are plane-parallel plates, the boundary surface between a substrate surface and a lens L has no optical power. Thus, for example, the surface accuracy on a substrate surface of a lens substrate LS little affects the focus position of the imaging lens LN on the image surface. This gives the imaging lens LN high performance.

In the imaging lens LN, a first lens block BK1 located at the most object-side position includes a first lens substrate LS1 and a lens L[LS1o] that is contiguous with the object-side substrate surface of the first lens substrate LS1, and the object-side lens surface of the lens L[LS1o] is convex to the object side.

With this design, the light (light beam) incident from the object side of the lens L[LS1o] is first made to converge, and is then, by various surfaces located to the image side of the lens L[LS1o], made to diverge from the optical axis and thereby separated into parts at different image heights (hereinafter, this phenomenon will be referred to as "a light beam being separated"). Separating a light beam by surfaces (substrate surfaces and lens surfaces) in this way permits, for example, lens surfaces to correct aberrations for each of the separated parts of the light beam. Thus, in the imaging lens LN, aberrations are corrected efficiently.

Furthermore, in the imaging lens LN, a second lens block BK2 located to the image side of the first lens block BK1 includes a second lens substrate LS2 and a lens L[LS2o] that is contiguous with the object-side substrate surface of the second lens substrate LS2, and the object-side lens surface of the lens L[LS2o] is concave to the object side.

The Petzval sum, which is defined by formula (PS) below, is then small. This is because the focal length of the object-side convex surface of the object-side lens surface of the lens L[LS1o] and the focal length of the object-side concave surface of the object-side lens surface of the lens L[LS2o] are in a mutually canceling relationship. When the Petzval sum is zero, the paraxial image surface has a curvature of zero, and is thus planar, providing an ideal surface.

[Formula PS]

$$\sum_j \frac{1}{f'^n j} \quad (PS)$$

where
fj represents the focal length of the jth lens surface as counted from the object side; and
nj represents the index of refraction of the lens material forming the jth lens surface as counted from the object side.

Moreover, the object-side concave surface of the lens L[LS2o] receives light in the process of being made to converge by the object-side convex surface (with a positive optical power) of the lens L[LS1o]. Thus, the object-side concave surface of the lens L[LS2o] corrects aberrations for a light beam before coming to have its minimal size, correcting aberrations even at the peripheral edge of the light beam.

Moreover, the distance from the object-side convex surface of the lens L[LS1o] to the object-side concave surface of the lens L[LS2o] is neither too small nor too large. Thus, much freedom is allowed in the curvature of the object-side concave surface of the lens L[LS2o], save the restrictions imposed by the positive optical power exerted by the object-side convex surface of the lens L[LS1o]. This makes it easy to design the lens L[LS2o] for a Petzval sum closer to zero.

Furthermore, it is preferable that the imaging lens LN be constructed as below. That is, in a third lens block BK3 located to the image side of the second lens block BK2, a lens L[LS3o] is contiguous with the object-side substrate surface of a third lens substrate LS3, and a lens L[LS3m] is contiguous with the image-side substrate surface of the third lens substrate LS3. And, the object-side lens surface of the lens L[ls3o] and the image-side lens surface of the lens L[LS3m] are aspherical.

Alternatively, the third lens block BK3 includes the lens L[LS3m] alone as a lens, and the lens L[LS3m] is contiguous with the image-side lens surface of a third lens LS3. And, the image-side lens surface of the lens L[LS3m] is aspherical. That is, it is preferable that, in a third lens block BK3 of an imaging lens LN, a lens surface of a lens L that makes contact with air be aspherical.

A light beam separated into parts at different image heights by the lens L[LS1o] etc. reaches such an aspherical surface. Thus, this aspherical surface efficiently corrects aberrations in, for example, light at comparatively high image heights, in which a single-focal-length imaging lens LN tends to produce aberrations. That is, lens L in the third lens block BK3, which is located comparatively close to the image side in the imaging lens LN, includes a lens surface shaped differently at different image heights (i.e. aspherical); thus, the imaging lens LN, despite being compact, corrects aberrations properly at different image heights.

Incidentally, in the imaging lens LN, aberrations are corrected not only when the object-side and image-side lens surfaces of the third lens block BK3 are both aspherical, but also when only one of the object-side and image-side lens surfaces of the third lens block BK3 is aspherical. Thus, aberrations in the imaging lens LN are efficiently corrected as long as at least one of the object-side and image-side lens surfaces of the third lens block BK3 is aspherical.

Thus, the above imaging lens LN can be manufactured easily and inexpensively, and in addition is compact and has high performance. Next, conditions and other features for striking a good balance among the various benefits described above and for achieving high-grade optical performance etc. will be described below.

For example, in the imaging lens LN, it is preferable that the first lens block BK1 exert a positive optical power, and that conditional formula (B1) below be fulfilled. Conditional formula (B1) defines the focal length of the object-side lens surface of the lens L[LS1o] in terms of the focal length of the entire imaging lens LN (entire system).

$$0.6 \leq f[L[LS1o]o]/f[\text{all}] \leq 2.0 \quad (B1)$$

where
f[L[LS1o]o] represents the focal length of the object-side lens surface of the lens L[LS1o], and
f[all] represents the focal length of the entire imaging lens LN.

If the value of conditional formula (B1) is less than the lower limit, for example, the positive optical power of the object-side lens surface of the lens L[LS1o] is too strong, and thus the angle of emergence of light from the image-side lens surface of the lens L[LS1o] (and hence the angle of emergence of light from the first block BK1) is excessively large. This leads to lower telecentricity to the image surface. Owing to the too strong positive optical power of the object-side lens surface of the lens L[LS1o], the imaging lens LN tends to produce aberrations. For example, if the curvature of the object-side lens surface of the lens L[LS1o] is so sharp as to produce comparatively large aberrations, the image-side lens surface (planar surface) of the lens L[LS1o] cannot correct them satisfactorily.

By contrast, if the value of conditional formula (B1) is more than the upper limit, for example, the positive optical power of the object-side lens surface of the lens L[LS1o] is too weak, and thus the light reaching the second lens block BK2 etc. is not separated into parts at different image heights. This makes it difficult to correct aberrations for parts of the light beam at different image heights. Moreover, as a result of the focal length of the object-side lens surface of the lens L[LS1o] being comparatively long, the imaging lens LN has an increased optical total length.

Thus, when the value of conditional formula (B1) falls within the range from the lower limit to the upper limit, the imaging lens LN is compact and has high performance (for example, telecentricity, and high aberration correction performance).

It is preferable that, within the conditional range defined by conditional formula (B1), the conditional range defined by conditional formula (B1a) below be fulfilled.

$$0.7 \leq f[L[LS1o]o]/f[\text{all}] \leq 1.6 \quad \text{(B1a)}$$

Moreover, it is preferable that the imaging lens LN fulfill conditional formula (B2). Conditional formula (B2) defines the ratio of the index of refraction of the first lens substrate LS1 to the index of refraction of the lens L[LS1o], and in short signifies that the index of refraction of the first lens substrate LS1 is larger than that of the lens L[LS1o].

$$1 < N[LS1]/N[L[LS1o]] \quad \text{(B2)}$$

where

N[LS1] represents the index of refraction of the first lens substrate LS1, and

Figure 19:
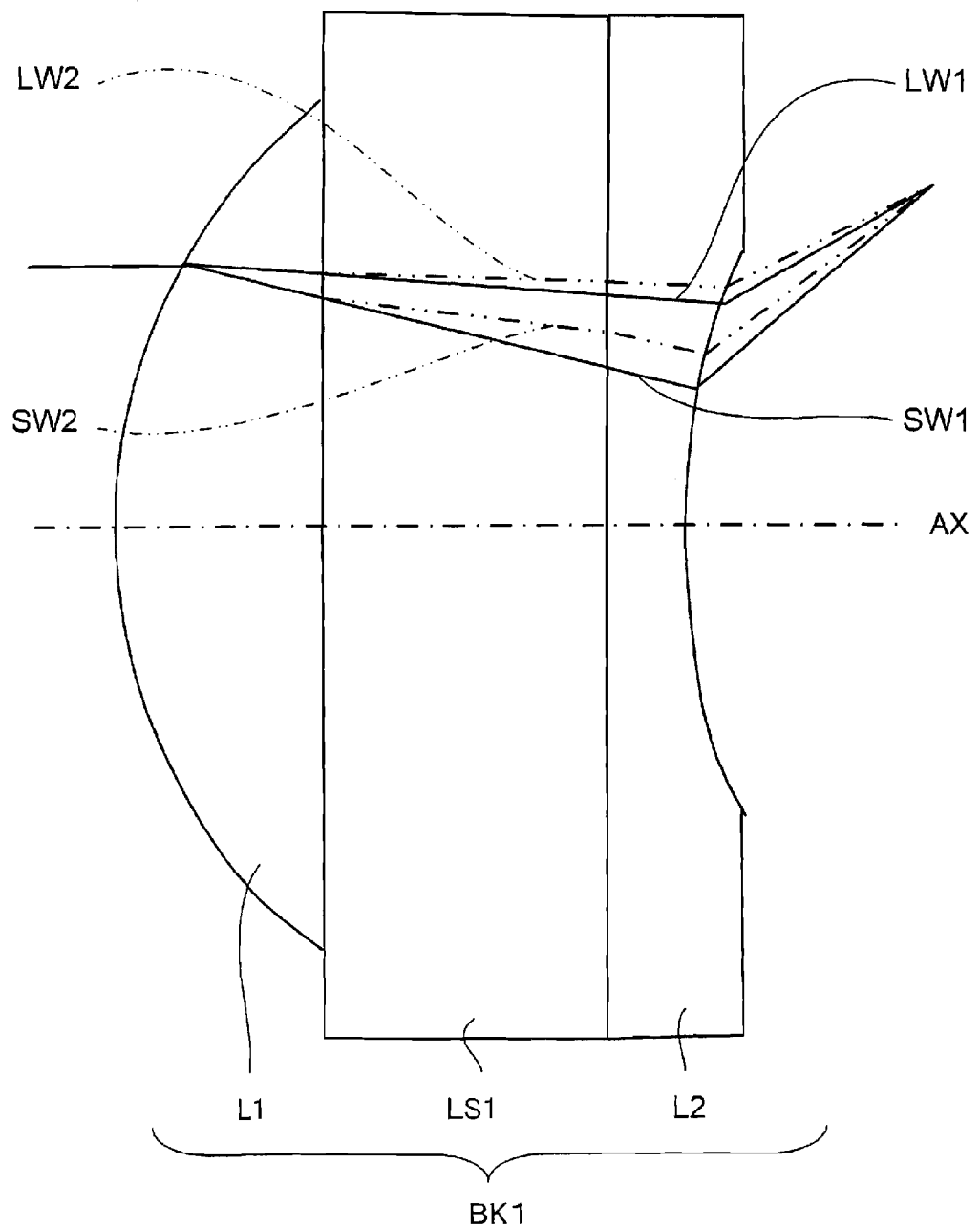
FIG. 19 is a sectional view showing a lens block used for an explanation.

N[L[LS1o]] represents the index of refraction of the lens L[LS1o]. A description will be given of conditional formula (B2) with reference to FIG. 19. FIG. 19 shows the first lens block BK1. In this figure, the solid lines SW1 and LW1 represent, for a case where the lens substrate LS1 is absent, the optical paths of short wavelength light and long wavelength light, respectively (in short, their optical paths on the assumption that they travel in air). The dash-dot-dot lines SW2 and LW2 represent, for a case where the lens substrate LS1 is present, the optical paths of short wavelength light and long wavelength light, respectively.

As shown in FIG. 19, light from the object side passes through a first lens L1 (lens L[LS1o]), the first lens substrate LS1, and a second lens L2 (lens L[LS1m]) in this order. Of the light incident on the first lens L1, short-wavelength light is, as it advances, refracted more than long-wavelength light. Thus, when the short wavelength light and the long wavelength light having passed through the first lens L1 are incident on the object-side substrate surface of the first lens substrate LS1, the angle of incidence of the short-wavelength light is larger than that of the long-wavelength light.

Here, because the index of refraction N[LS1] of the first lens substrate LS1 is higher than the index of refraction N[L[LS1o]] of the first lens L1, according to Snell's law, the angle of emergence at which short wavelength light emerges from the object-side substrate surface of the first lens substrate LS1 is smaller than the angle of incidence at which it is incident on the object-side substrate surface. Needless to say, the same applies to long wavelength light.

The difference in index of refraction between the first lens L1 and the first lens substrate LS1 with respect to short-wavelength light is greater than the difference in index of refraction between the first lens L1 and the first lens substrate LS1 with respect to long-wavelength light (in short, of short wavelength light and long wavelength light incident from the first lens L1 on the first lens substrate LS1, the short-wavelength light is refracted more).

Accordingly, the optical path LW2 of the long wavelength light traveling in the first lens substrate LS1 is, as it advances, refracted to deviate slightly toward the peripheral edge of the first lens substrate LS1 as compared with the optical path LW1. On the other hand, the optical path SW2 of the short wavelength light traveling in the first lens substrate LS1 is, as it advances, refracted to deviate greatly toward the peripheral edge of the first lens substrate LS1 as compared with the optical path SW1.

As a result, the optical path distance between the short wavelength light and the long wavelength light (see SW2 and LW2) traveling in the first lens substrate LS1 is smaller than the optical path distance between the short wavelength light and the long wavelength light (see SW1 and LW1) as observed when they travel in air in the absence of the first lens substrate LS1. Thus, with an imaging lens LN fulfilling conditional formula (B2), chromatic aberration attributable to a difference in light wavelength is corrected.

It is preferable that the Abbe number of the first lens substrate LS1 be 50 or smaller. That is, it is preferable that conditional formula (B3) below be fulfilled. It is more preferable that the Abbe number of the first lens substrate LS1 be smaller than that of the lens L[LS1o], chromatic aberration being improved.

$$\nu[LS1] \leq 50 \quad \text{(B3)}$$

where $\nu[LS1]$ represents the Abbe number of the first lens substrate LS1.

The Abbe number is a value for indicating the dispersion of a material, and specifically is the ratio of the difference between the index of refraction nF of the material for blue light having a wavelength of 486.1 nm (F-line) and the index of refraction nC of the material for red light having a wavelength of 587.6 nm to the difference between the index of refraction of the material for yellow light having a wavelength of 587.6 nm (d line) and the index of refraction of air. A small Abbe number signifies a large difference between the index of refraction for F-line and the index of refraction for C-line. This means that short-wavelength light is refracted comparatively greatly.

Thus, with an imaging lens LN fulfilling conditional formula (B3), as in a case where conditional formula (B2) is fulfilled, chromatic aberration is corrected. Needless to say, it is further preferable that conditional formulae (B2) and (B3) be both fulfilled simultaneously.

However, other than imaging lenses LN fulfilling conditional formulae (B2) and (B3), there still are imaging lenses LN that are manufactured easily and inexpensively and yet correct chromatic aberration. Examples of such imaging lenses LN include an imaging lens LN fulfilling conditional formulas (B4) and (B5) below. Conditional formula (B4) defines the ratio of the index of refraction of the first lens substrate LS1 to the index of refraction of the lens L[LS1o], and in short signifies that the index of refraction of the first lens substrate LS1 is smaller than that of the lens L[LS1o].

$$N[LS1]/N[L[LS1o]] < 1 \quad \text{(B4)}$$

$$40 \leq \nu[LS1] \quad \text{(B5)}$$

where
N[LS1] represents the index of refraction of the first lens substrate LS1,
N[L[LS1o]] represents the index of refraction of the lens L[LS1o], and
ν[LS1] represents the Abbe number of the first lens substrate LS1.

Figure 20:
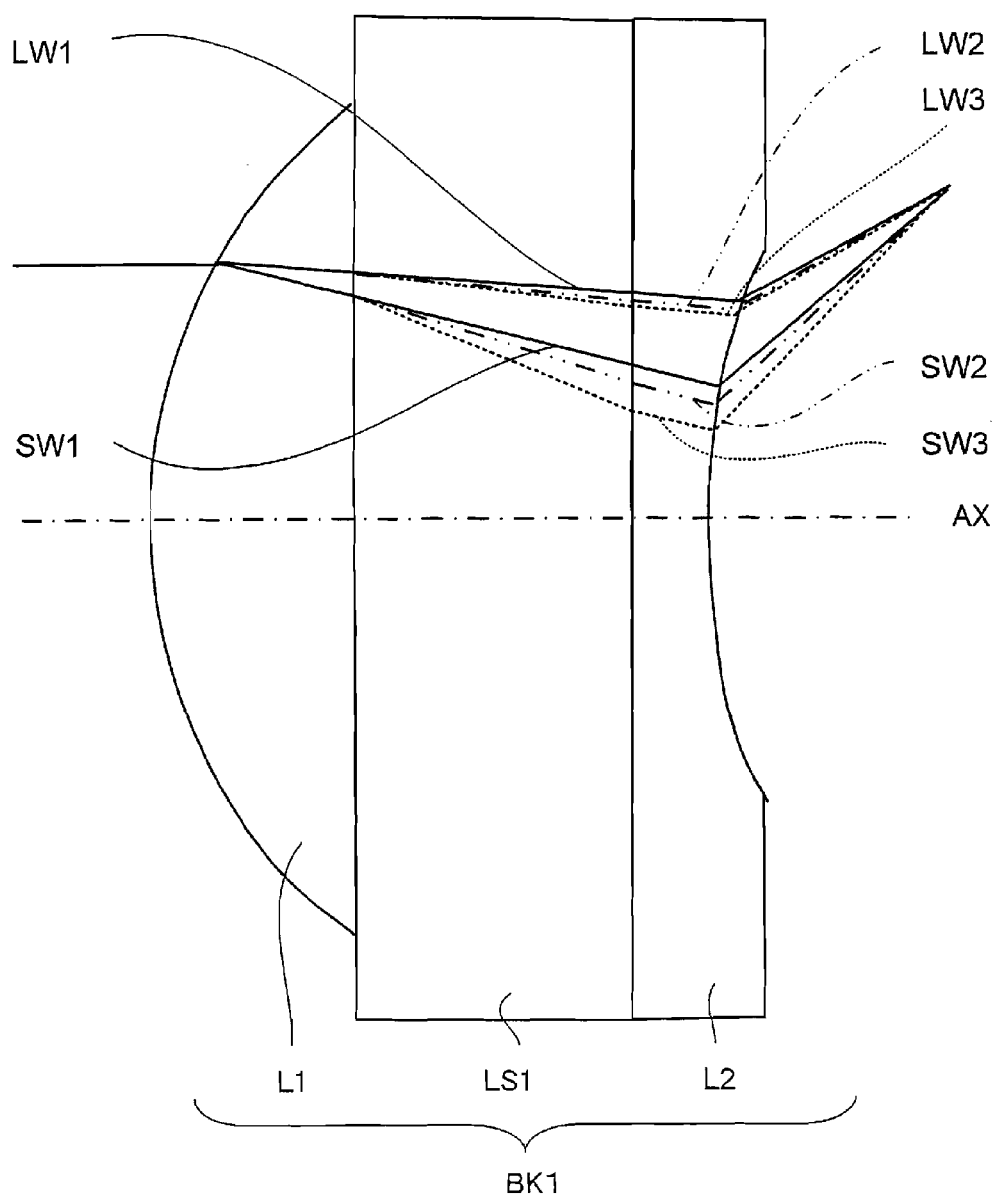
FIG. 20 is a sectional view showing another lens block used for an explanation, different from the one shown in FIG. 19.

A description will be given of conditional formula (B5) with reference to FIG. 20. FIG. 20, like FIG. 19, shows a lens block BK1. In this figure, the solid lines SW1 and LW1 represent, for a case where a lens substrate LS1 is absent, the optical paths of short wavelength light and long wavelength light, respectively. The dash-dot-dot lines SW2 and LW2 represent, for a case where the lens substrate LS1 that fulfills conditional formula (B5) is present, the optical paths of short wavelength light and long wavelength light, respectively. The dotted lines SW2 and LW2 represent, for a case where the lens substrate LS1 that does not fulfill conditional formula (B5) is present, the optical paths of short wavelength light and long wavelength light, respectively.

As described previously, of the light incident on the first lens L1 (lens L[LS1o]), short wavelength light is, as it advances, refracted more than long wavelength light; thus, when the short wavelength light and the long wavelength light having passed through the first lens L1 is incident on the object-side substrate surface of the first lens substrate LS1, the angle of incidence of the short wavelength light is larger than that of the long wavelength light.

Since the index of refraction N[LS1] of the first lens substrate LS1 is lower than the index of refraction N[L[LS1o]] of the first lens L1, according to Snell's law, the angle of emergence at which short wavelength light emerges from the object-side substrate surface of the first lens substrate LS1 is larger than the angle of incidence at which it is incident on the objective-side substrate surface of the first lens substrate LS1. Needless to say, the same applies to the long wavelength light.

If, in addition, the Abbe number here is comparatively small, the band of light formed between the optical path SW3 of short wavelength light and the optical path LW3 of long wavelength light widens as it approaches the image side of the first lens substrate LS1 (i.e., the optical path displacement between the optical path SW3 and the optical path LW3 increases). As a result, notable chromatic aberration occurs.

However, when conditional formula (B5) is fulfilled, the band of light formed between the optical path SW2 of short wavelength light and the optical path LW2 of long wavelength light does not widen as much as the band of light formed between the optical path SW3 of short wavelength light and the optical path LW3 of long wavelength light. That is, the optical path displacement between the optical path SW2 and the optical path LW2 does not increase excessively. Thus, with an imaging lens LN fulfilling conditional formulae (B4) and (B5), as with an imaging lens LN fulfilling at least one of conditional formulae (B2) and (B3), chromatic aberration attributable to a difference in light wavelength is corrected. Incidentally, if the Abbe number of the first lens substrate LS1 is greater than that of the lens L[LS1o], chromatic aberration is improved.

Moreover, in the imaging lens LN, it is preferable that conditional formula (B6) below be fulfilled. Conditional formula (B6) defines the thickness of the first lens substrate LS in terms of the optical total length.

$$0.03 \leq d[LS1]/TL \leq 0.33 \quad (B6)$$

where
d[LS1] represents the thickness of the first lens substrate LS1 along the optical axis; and
TL represents the distance from the most object-side surface in the imaging lens LN to the imaging surface along the optical axis.

If the value of conditional formula (B6) is less than the lower limit, the first lens substrate LS1 is so thin that the first lens block BK1 is difficult to manufacture. Furthermore, in a case where the first lens substrate LS1 is formed thin by grinding a commercially available glass plate, the cost of the amount of material so ground away is wasted. Moreover, the too thin first lens substrate LS1 may necessitate increasing the thicknesses of the lenses L[LS1o] and L[LS1m] with expensive resin, leading to an increased cost of the first lens block BK1 (and hence of the imaging lens LN).

By contrast, if the value of conditional formula (B6) is more than the upper limit, the first lens substrate LS1 is too thick, and hence the first lens block BK1 is too thick. The excessive thicknesses here lead to increased astigmatic difference.

In addition, in a three-or-less-element compact optical system, it is preferable that the most object-side lens be a meniscus lens convex to the object side as disclosed in JP-A-2006-91638 and JP-A-2006-98504. If the first lens substrate LS1 is too thick as mentioned above, however, the first lens block BK1 has a shape far from a thin meniscus shape. This imposes restrictions on the design, in connection with aberration correction, of the imaging lens LN (in short, such an imaging lens LN has low aberration correction performance). In addition, an imaging lens LN including such a first lens block BK1 is unsuitable as a wide-angle lens system.

Thus, when the value of conditional formula (B6) falls within the range from the lower limit to the upper limit, the imaging lens LN is manufactured inexpensively, and in addition is compact and has high performance. It is particularly preferable that, within the conditional range defined by conditional formula (B6), the conditional range defined by conditional formula (B6a) below be fulfilled.

$$0.065 \leq d[LS1]/TL \leq 0.19 \quad (B6a)$$

In an imaging lens LN fulfilling conditional formulae (B2) and (B3), and in an imaging lens LN fulfilling conditional formulae (B4) and (B5), fulfilling either conditional formula (B6) or (B6a) helps properly restrict the widening of the band of light formed (the dispersion of light occurring), when light passes through the first lens substrate LS1, between the optical path SW2 of short wavelength light and the optical path LW2 of long wavelength light.

Moreover, in the imaging lens LN, it is preferable that conditional formulae (B7) and (B8) below be fulfilled. Conditional formula (B7) defines the range of the ratio between the optical total length and the maximum image height in the imaging lens LN, signifying that the imaging lens LN is compact, its optical total length being regulated to be at most about twice the maximum image height. Conditional formula (B8) defines the sum of the aerial distances between the lens blocks BK in terms of the optical total length.

$$TL/Y' \leq 2.06 \quad (B7)$$

$$Ar/TL \leq 0.5 \quad (B8)$$

where
TL represents the distance from the most object-side surface in the imaging lens LN to the imaging surface along the optical axis;
Y' represents a maximum image height; and
Ar represents a sum of aerial distances between adjacent lens blocks BK in the imaging lens (including a thickness of any optical element having no optical power other than a lens block BK, as given as an equivalent thickness in air).

A compact imaging lens LN fulfilling conditional formula (B7), when integrated with an imaging sensor SR, forms a compact module (camera module). The camera module is fitted on a printed circuit board (circuit board) having solder paste printed on it, and is then heated (for reflow soldering); thereby the module is mounted on the printed circuit board.

In such reflow soldering for mounting, the imaging lens LN is placed in an environment close to 300° C. (about 250 to 280° C.). Thus, as shown in FIG. 18C, the air sealed between the lens blocks BK by the spacer member B1 expands. If the air expands excessively, the lens blocks may separate from each other, and thus the imaging lens LN may break.

To prevent such breakage of the imaging lens LN, it is preferable that the imaging lens fulfill conditional formula (B8). Specifically, it is preferable that the aerial distance in the imaging lens LN be as short as possible. It is particularly preferable that, within the conditional range defined by conditional formula (B8), the conditional range defined by conditional formula (B8a) below be fulfilled. Within this conditional range, the air confined inside the imaging lens LN when it is sealed is sufficiently small.

$$Ar/TL \leq 0.395 \tag{B8a}$$

In addition, in the imaging lens LN, it is preferable that conditional formula (B9) below be fulfilled. Conditional formula (B1) defines the paraxial radius of curvature of the object-side lens surface of the lens L[LS2o] in terms of the focal length of the entire imaging lens LN.

$$-2.0 \leq r[L[LS2o]o]/f[\text{all}] \leq 0.35 \tag{B9}$$

where r[L[LS2o]o] represents the paraxial radius of curvature of the object-side lens surface of the lens L[LS2o]; and f[all] represents a focal length of the entire imaging lens.

If the value of conditional formula (B9) is less than the lower limit, for example, the paraxial radius of curvature of the object-side lens surface of the lens L[LS2o] is comparatively long, and thus the power of the lens surface cannot be fully exerted. In such a case, spherical aberration attributable to the object-side lens surface of the lens L[LS1o] cannot be satisfactorily corrected by the power of the object-side lens surface of the lens L[LS2o]. This results in notable spherical aberration of the imaging lens LN.

By contrast, if the value of conditional formula (B9) is more than the upper limit, for example, the paraxial radius of curvature of the object-side lens surface of the lens L[LS2o] is comparatively short, and thus the power of the lens surface is excessively exerted. In such a case, spherical aberration attributable to the object-side lens surface of the lens L[LS1o] is excessively corrected by the power of the object-side lens surface of the lens L[LS2o].

Thus, when the value of conditional formula (B9) falls within the range from the lower limit to the upper limit, the imaging lens LN properly corrects spherical aberration, and furthermore astigmatism is also corrected. Specifically, if the value of conditional formula (B9) is less than the lower limit, notable astigmatism appears, and if the value of conditional formula (B9) is more than the upper limit, off-axial parts of a light beam cannot be trapped; however, when the value of conditional formula (B9) falls within the range from the lower limit to the upper limit, such events do not occur. Thus, when the value of conditional formula (B9) falls within the range from the lower limit to the upper limit, the imaging lens LN has comparatively high aberration correction performance.

In particular, it is more preferable that the imaging lens LN fulfill the conditional range defined by conditional formula (B9a) below instead of that defined by conditional formula (B9) above.

$$-1.5 \leq r[L[LS2o]o]/f[\text{all}] \leq -0.4 \tag{B9a}$$

On the assumption that the imaging lens LN is placed in a high temperature environment, it is preferable that the lens substrate LS be formed out of glass with comparatively high resistance to heat. It is particularly preferable that the glass be high-softening-point glass (the heat-resistance etc. of the lens L will be described later).

Shown below in a table are, for each of the practical examples (EX1 to EX8), the results of conditional formulae (B1 to B8). In the table, an underscored value signifies that the relevant condition is not fulfilled.

TABLE 17

| | EX1 | EX2 | EX3 | EX4 | EX5 | EX6 | EX7 | EX8 |
|---|---|---|---|---|---|---|---|---|
| | $0.6 \leq f[L[LS1o]o]/f[\text{all}] \leq 2.0 \ldots$ (B1) | | | | | | | |
| B1 | 0.93 | 0.92 | 1.49 | 0.83 | 0.78 | 0.92 | 1.01 | 1.01 |
| | $1 < N[LS1]/N[L[LS1o]] \ldots$ (B2) | | | | | | | |
| B2 | 1.2214 | 0.9869 | 1.0001 | 1.0290 | 0.9700 | 0.9869 | 1.1700 | 1.0153 |
| | $\nu[LS1] \leq 50 \ldots$ (B3) | | | | | | | |
| B3 | 40.83 | 70.44 | 64.10 | 43.35 | 56.00 | 70.44 | 49.60 | 48.91 |
| | $N[LS1]/N[L[LS1o]] < 1 \ldots$ (B4) | | | | | | | |
| B4 | 1.2214 | 0.9869 | 1.0001 | 1.0290 | 0.9700 | 0.9869 | 1.1700 | 1.0153 |
| | $40 \leq \nu[LS1] \ldots$ (B5) | | | | | | | |
| B5 | 40.83 | 70.44 | 64.10 | 43.35 | 56.00 | 70.44 | 49.60 | 48.91 |
| | $0.03 \leq d[LS1]/TL \leq 0.33 \ldots$ (B6) | | | | | | | |
| B6 | 0.09 | 0.14 | 0.08 | 0.09 | 0.10 | 0.14 | 0.12 | 0.09 |
| | $TL/Y' \leq 2.06 \ldots$ (B7) | | | | | | | |
| B7 | 1.870 | 1.820 | 2.060 | 1.815 | 1.650 | 1.820 | 1.710 | 1.830 |
| | $Ar/TL \leq 0.5 \ldots$ (B8) | | | | | | | |
| B8 | 0.280 | 0.380 | 0.500 | 0.304 | 0.440 | 0.380 | 0.340 | 0.217 |
| | $-2.0 \leq r[L[LS2o]o]/f[\text{all}] \leq -0.35 \ldots$ (B9) | | | | | | | |
| B9 | −0.593 | −0.482 | −0.413 | −0.620 | −1.924 | −0.478 | −1.312 | −1.143 |

Embodiment 2

Embodiment 2 will now be described. Such members as function similarly to their counterparts in Embodiment 1 are identified by common reference signs and no description of them will be repeated. In this embodiment, the resin out of which the lenses L are formed will be discussed.

Resin excels in workability. Thus, forming the lenses L enumerated in connection with Embodiment 1 out of resin allows easy formation of aspherical lens surfaces by use of molds or the like.

Generally, however, if fine particles are mixed in transparent resin (such as polymethyl methacrylate), light is scattered inside the resin, and lower transmittance results. Thus, resin containing fine particles can be said to be unsuitable as an optical material.

Moreover, the index of refraction of resin varies with temperature. For example, let us calculate, according to the Lorenz-Lorenz formula (LL) below, the temperature dependence of the index of refraction of polymethyl methacrylate (PMMA), that is, its temperature-dependent refractive-index variation (dn/dt).

[Formula LL]

$$\frac{dn}{dt} = \frac{(n^2+2) \times (n^2-1)}{6n} \times \left\{ (-3\alpha) + \frac{1}{[R]} \times \frac{\partial [R]}{\partial t} \right\} \quad (LL)$$

where
n represents the index of refraction of the resin;
t represents temperature;
$\alpha$ represents the coefficient of linear expansion (with PMMA, $\alpha=7\times10^{-5}$); and
[R] represents molecular refraction.

Then, with PMMA, the refractive-index variation is found to be "$-1.2\times10^{-4}$ [/° C.]". This value approximately agrees with actual measurements. Thus, forming the lenses L out of resin (plastic) alone results in their refractive-index variation being dependent on temperature. If, in addition, fine particles are mixed in such resin out of which the lenses are formed, the lenses L then not only scatter light but also change their indices of refraction with temperature.

In recent years, however, it has increasingly been recognized that resin containing properly designed fine particles can be used as an optical material. This is because, in resin containing fine particles (a mixed resin), if the particle diameter of the fine particles is smaller than the wavelength of transmitted light, no scattering of light occurs.

In addition, when the fine particles are inorganic ones, their index of refraction increases as temperature increases. Thus, in a mixed resin, as temperature rises, the index of refraction of the resin decreases and simultaneously the index of refraction of the inorganic fine particles increases. In this way, their respective temperature dependence (the decrease in the index of refraction of one and the increase in the index of refraction of the other) is canceled out, with the result that the index of refraction of the mixed resin varies less with temperature (for example, in the lenses L, the variation of their index of refraction is reduced to as small as the effect of the variation of the surface shape on the positions of the paraxial image points).

As one example of a mixed resin as described above, JP-A-2007-126636 discloses one having inorganic fine particles with a maximum length of 30 nm or less (an added material, such as niobium oxide ($Nb_2O_5$)) dispersed in resin (a base material).

In light of the foregoing, when the lenses L are formed out of resin having fine particles of 30 nm or less dispersed in it (a mixed resin), the imaging lens LN including those lenses L has high durability to temperature. Moreover, for example, by properly adjusting the ratio of resin to inorganic fine particles in the mixed resin, the length of the particle diameter of the inorganic fine particles (for example, 20 nm or less, further preferably 15 nm or less), the kind of resin used as the base material, and the kind of inorganic fine particles used as the added material, it is possible to give the lenses L high indices of refraction. Thus, when the lenses L are formed out of a mixed resin, the imaging lens LN including those lenses L is more compact, and the lenses L are less difficult to mold.

It is preferable that the resin mentioned above be a hardening resin. This is because a hardening resin allows easy manufacture of the lenses L including aspherical surfaces by use of molds or the like. Moreover, when the resin is adhesive (or when adhesive is mixed in the resin), the lenses L formed out of it can be cemented to the lens substrates LS easily. That is, the lens blocks including the lens substrates LS and lenses L directly bonded together are manufactured easily.

Furthermore, it is preferable that the resin mentioned above is heat-resistant. For example, a module (camera module) having the imaging lens LN and the image sensor SR integrated into a unit is fitted on a printed circuit board having solder paste printed on it, and is then heated (for reflow soldering); thereby the module is mounted on the printed circuit board. Such mounting is handled by automation. Thus, when the lenses L are formed out of a heat-resistant hardening resin, they withstand reflow soldering, and are therefore suitable for automation (needless to say, it is preferable that the lens substrates LS also be formed out of a material with high resistance to heat, for example, glass).

Examples of hardening resins include thermosetting resins and ultraviolet (UV)-curing resins.

With a thermosetting resin, even when the lenses L are comparatively thick, they are manufactured accurately. On the other hand, with an UV-curing resin, since it hardens in a comparatively short time, the lenses can be manufactured in a short time.

It should be understood that the embodiments specifically described above are not meant to limit the present invention, and that many variations and modifications can be made within the spirit of the present invention.

The invention claimed is:

1. An imaging lens, comprising:
   at least three lens blocks each including
      a lens substrate that is a plane-parallel plate and
      a lens contiguous with at least one of object-side and image-side substrate surfaces of said lens substrate, said lens exerting a positive or negative optical power; and
   an aperture stop restricting light amount,
   wherein, in each of said lens blocks, said lens is formed of a material different from a material of which said lens substrate is formed;
   wherein said lens blocks comprise a first lens block disposed at a most object-side position;
   wherein the first lens block includes, as said lens substrate, a first lens substrate, and as said lens, a lens L[LS1o] contiguous with an object-side substrate surface of the first lens substrate;
   wherein an object-side lens surface of the lens L[LS1o] is convex to an object side;

wherein the first lens block excerts a positive optical power;

wherein said lens blocks comprise a second lens block disposed to an image side of the first lens block;

wherein the second lens block includes, as said lens substrate, a second lens substrate, and as said lens, a lens L[LS2o] contiguous with an object-side substrate surface of the second lens substrate;

wherein an object-side lens surface of the lens L[LS2o] is concave to an object side;

wherein said lens blocks comprise a third lens block disposed to an image side of The second lens block;

wherein the third lens block includes, as said lens substrate, a third lens substrate, And as said lens, a lens contiguous with at least one of object-side and image-side substrate surfaces of the third lens substrate, the lens being a lens L[Ls3o] if contiguous with the object-side substrate surface of the third lens substrate, and being a lens L[Ls3m] if contiguous with the image-side substrate surface of the third lens substrate;

wherein at least one of an object-side lens surface of the lens L[Ls3o] and an image-side lens surface of the lens L[LS3m] is aspherical; and wherein conditional formula (B1) below is fulfilled;

$$0.6 \leq f[L[LS1o]o]/f[all] \leq 2.0 \tag{B1}$$

where f[L[LS1o]o] represents a focal length of the object-side lens surface of the lens L[LS1o], and f[all] reprsents a focal length of the entire imaging lens.

2. The imaging lens of claim 1, wherein conditional formula (B2) below is fulfilled:

$$1 < N[LS1]/N[L[LS1o]] \tag{B2}$$

where

N[LS1] represents an index of refraction of the first lens substrate; and

N[L[LS1o]] represents an index of refraction of the lens L[LS1o].

3. The imaging lens of claim 2, wherein conditional formula (B3) below is fulfilled:

$$v[LS1] \leq 50 \tag{B3}$$

where v[LS1] represents an Abbe number of the first lens substrate.

4. The imaging lens of claim 1, wherein conditional formulae (B4) and (B5) below are fulfilled:

$$N[LS1]/N[L[LS1o]] < 1 \tag{B4}$$

$$40 \leq v[LS1] \tag{B5}$$

where

N[LS1] represents an index of refraction of the first lens substrate;

N[L[LS1o]] represents an index of refraction of the lens L[LS1o]; and v[LS1] represents an Abbe number of the first lens substrate.

5. The imaging lens of claim 1, wherein conditional formula (B6) below is fulfilled:

$$0.03 \leq d[LS1]/TL \leq 0.33 \tag{B6}$$

where d[LS1] represents a thickness of the first lens substrate along an optical axis, and TL represents a distance from a most object-side surface in the imaging lens to an imaging surface along the optical axis.

6. The imaging lens of claim 1, wherein conditional formulae (B7) and (B8) below are fulfilled:

$$TL/Y' \leq 2.06 \tag{B7}$$

$$Ar/TL \leq 0.5 \tag{B8}$$

where

TL represents a distance from a most object-side surface in the imaging lens to an imaging surface along the optical axis, Y' represents a maximum image height, and Ar represents a sum of aerial distances between adjacent lens blocks in the imaging lens (including a thickness of any optical element having no optical power other than a lens block, as given as an equivalent thickness in air).

7. The imaging lens of claim 1, wherein conditional formula (B9) below is fulfilled:

$$-2.0 \leq r[L[LS2o]o]/f[all] \leq -0.35 \tag{B9}$$

where r[L[LS2o]o] represents a paraxial radius of curvature of the object-side lens surface of the lens L[LS2o], and f[all] represents the focal length of the entire imaging lens.

8. The imaging lens of claim 1, wherein said lens substrate is formed of glass.

9. The imaging lens of claim 1, wherein said lens is formed of resin.

10. The imaging lens of claim 9, wherein the resin of which said Lens is formed has inorganic fine particles with a particle diameter of 30 nm or less dispersed therein.

11. The imaging lens of claim 9, wherein the resin is a hardening resin.

12. An imaging device comprising: the imaging lens of claim 1, and an image sensor sensing light passing through the imaging lens.

13. A portable terminal comprising: the imaging device of claim 12.

14. A method of manufacturing the imaging lens of claim 1, comprising, let a unit including, as each of said lens blocks, a plurality of lens blocks arranged in an array be called a lens block unit:

a joining step of arranging a spacer at least at part of a peripheral edge of the lens blocks and joining the plurality of lens block units together; and a cutting step of cutting the joined-together lens block units along the spacer.

* * * * *